(12) United States Patent
Kim et al.

(10) Patent No.: US 10,664,075 B2
(45) Date of Patent: May 26, 2020

(54) WATCH TYPE MOBILE TERMINAL AND METHOD FOR CONTROLLING THE SAME

(71) Applicant: LG ELECTRONICS INC., Seoul (KR)

(72) Inventors: Yung Kim, Seoul (KR); Jonghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/008,568

(22) Filed: Jun. 14, 2018

(65) Prior Publication Data

US 2018/0299973 A1    Oct. 18, 2018

Related U.S. Application Data

(63) Continuation of application No. 15/340,464, filed on Nov. 1, 2016, now Pat. No. 10,025,399.
(Continued)

(30) Foreign Application Priority Data

May 31, 2016   (KR) .................. 10-2016-0067018

(51) Int. Cl.
*G06F 3/0362* (2013.01)
*G06F 3/0485* (2013.01)
(Continued)

(52) U.S. Cl.
CPC .......... *G06F 3/0362* (2013.01); *G04C 3/001* (2013.01); *G04G 9/007* (2013.01); *G04G 21/08* (2013.01);
(Continued)

(58) Field of Classification Search
CPC ...... G06F 3/0362; G06F 3/0482; G06F 3/167; G06F 3/0488; G06F 3/0485;
(Continued)

(56) References Cited

U.S. PATENT DOCUMENTS 6,272,076 B1    8/2001  Dinger
7,359,688 B2 *  4/2008  Seo ..................... A63F 13/12
                                              455/218
(Continued)

FOREIGN PATENT DOCUMENTS

EP       1850213 A2      10/2007
JP    2004-184396 A       7/2004
(Continued)

OTHER PUBLICATIONS

Apple, iPod Classic User Guide, 2009, pp. 1-78 (Year: 2009).*

*Primary Examiner* — Patrick F Marinelli
(74) *Attorney, Agent, or Firm* — Birch, Stewart, Kolasch & Birch, LLP

(57) ABSTRACT

A method of controlling a watch-type mobile terminal including a bezel, the method includes executing a contact application stored in a memory; outputting a contact list on a display unit when the contact application is executed; sensing a touch input signal on the display unit, wherein the touch input signal is a drag touch input on the display unit in a first direction; scrolling the contact list to search for a specific contact regardless of the drag touch input's speed; sensing a rotation input on the bezel, wherein the rotation input is an input for rotating the bezel with a speed in a second direction, further the first direction is different from the second direction; and controlling a scroll pop-up for searching for the specific contact to be output on the contact list of the contact application if the speed of the rotation input is faster than a first predetermined speed.

7 Claims, 31 Drawing Sheets

Related U.S. Application Data

(60) Provisional application No. 62/309,434, filed on Mar. 16, 2016.

(51) Int. Cl.

| | | |
|---|---|---|
| *G10L 15/26* | (2006.01) | |
| *G06F 3/0488* | (2013.01) | |
| *G04G 9/00* | (2006.01) | |
| *G06F 3/0482* | (2013.01) | |
| *H04M 1/2745* | (2020.01) | |
| *G04G 21/08* | (2010.01) | |
| *G04C 3/00* | (2006.01) | |
| *G06F 1/16* | (2006.01) | |

(52) U.S. Cl.
CPC ............ *G06F 1/163* (2013.01); *G06F 3/0482* (2013.01); *G06F 3/0485* (2013.01); *G06F 3/0488* (2013.01); *G10L 15/26* (2013.01); *H04M 1/274525* (2013.01); *H04M 2250/74* (2013.01)

(58) Field of Classification Search
CPC ... G06F 3/0487; G06F 3/03547; G04G 9/007; G04G 21/00; G04B 19/283; G04B 3/046; G10L 15/26; H04M 2250/74; H04M 1/274525

See application file for complete search history.

(56) References Cited

U.S. PATENT DOCUMENTS

| | | | |
|---|---|---|---|
| 8,896,526 B1 | 11/2014 | Park | |
| 9,626,152 B2* | 4/2017 | Kim | G06F 17/276 |
| 9,684,430 B1* | 6/2017 | Perigault | G06F 3/04817 |
| 10,001,817 B2* | 6/2018 | Zambetti | G06F 1/1694 |
| 10,025,399 B2* | 7/2018 | Kim | G06F 3/0362 |
| 2002/0101457 A1 | 8/2002 | Lang | |
| 2003/0128192 A1* | 7/2003 | van Os | G06F 3/0482 |
| | | | 345/173 |
| 2005/0261032 A1* | 11/2005 | Seo | A63F 13/12 |
| | | | 455/566 |
| 2005/0273327 A1* | 12/2005 | Krishnan | G10L 19/0018 |
| | | | 704/235 |
| 2007/0132789 A1* | 6/2007 | Ording | G06F 3/0485 |
| | | | 345/684 |
| 2007/0150830 A1* | 6/2007 | Ording | G06F 3/0481 |
| | | | 715/784 |
| 2008/0049562 A1* | 2/2008 | Andren | G04B 19/283 |
| | | | 368/295 |
| 2009/0051649 A1* | 2/2009 | Rondel | G06F 1/163 |
| | | | 345/156 |
| 2009/0240912 A1* | 9/2009 | Wakrat | G06F 12/0646 |
| | | | 711/173 |
| 2009/0289913 A1* | 11/2009 | Chang | G06F 3/0485 |
| | | | 345/173 |
| 2010/0177048 A1* | 7/2010 | Semenets | G06F 3/0233 |
| | | | 345/173 |
| 2015/0022438 A1 | 1/2015 | Hong | |
| 2015/0100537 A1* | 4/2015 | Grieves | G06N 5/048 |
| | | | 706/52 |
| 2015/0370529 A1* | 12/2015 | Zambetti | G06F 1/1694 |
| | | | 345/156 |
| 2016/0007910 A1* | 1/2016 | Boss | A61B 5/02055 |
| | | | 600/301 |
| 2016/0104484 A1* | 4/2016 | Chakladar | G10L 15/22 |
| | | | 704/235 |
| 2016/0210116 A1* | 7/2016 | Kim | G06F 17/276 |
| 2016/0292148 A1* | 10/2016 | Aley | G06F 17/276 |
| 2016/0327911 A1* | 11/2016 | Eim | G04B 27/002 |
| 2017/0038859 A1 | 2/2017 | Park et al. | |
| 2017/0115860 A1* | 4/2017 | Youn | G06F 3/0482 |
| 2017/0131795 A1* | 5/2017 | Park | G06F 3/0362 |
| 2017/0160898 A1 | 6/2017 | Lee et al. | |
| 2017/0168461 A1* | 6/2017 | Bang | G04B 19/04 |
| 2017/0255169 A1 | 9/2017 | Lee et al. | |
| 2017/0269715 A1* | 9/2017 | Kim | G06F 3/0362 |
| 2017/0301314 A1 | 10/2017 | Kim et al. | |

FOREIGN PATENT DOCUMENTS

| | | |
|---|---|---|
| KR | 10-2015-0062761 A | 6/2015 |
| WO | WO 2014/189197 A1 | 11/2014 |
| WO | WO 2015/039960 A1 | 3/2015 |

\* cited by examiner

FIG. 9
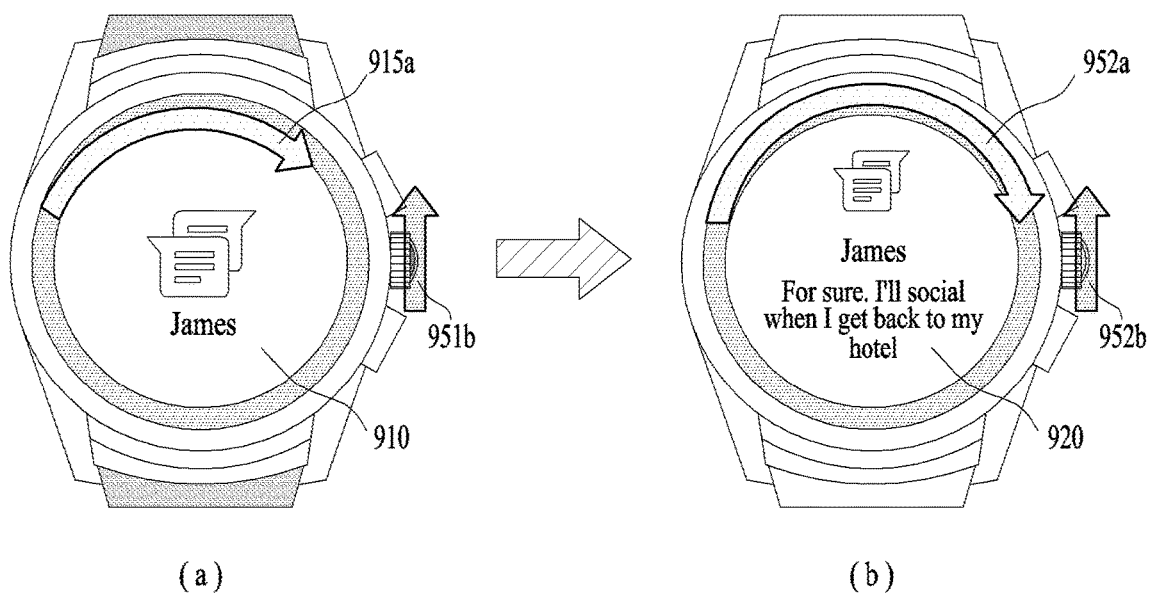
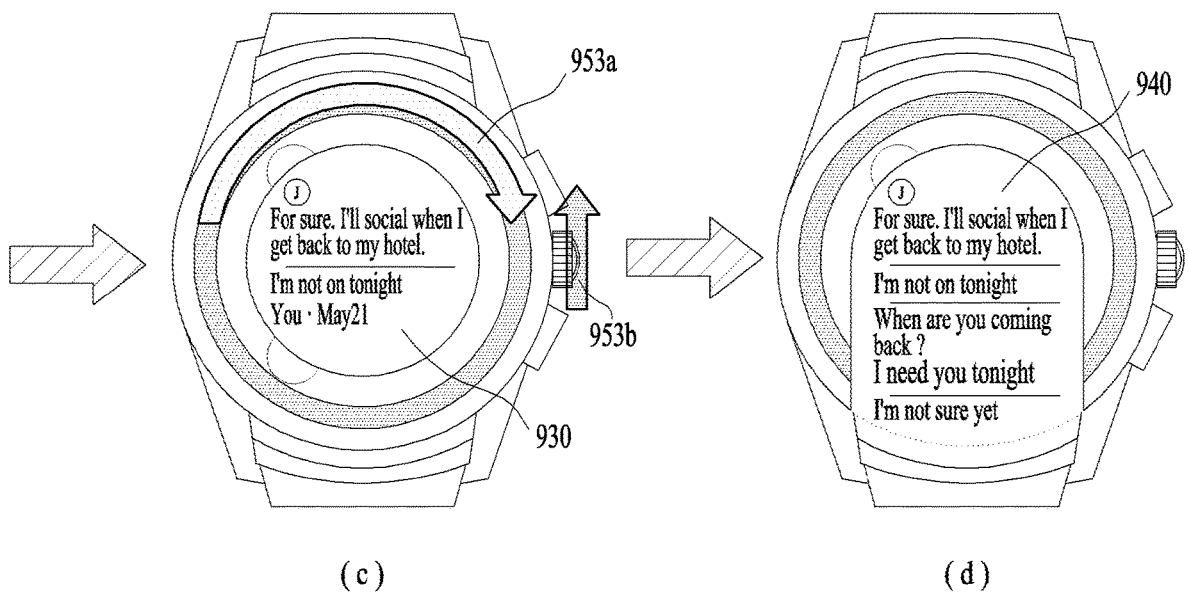

(a)　　　　　　　　　　　　(b)

FIG. 16
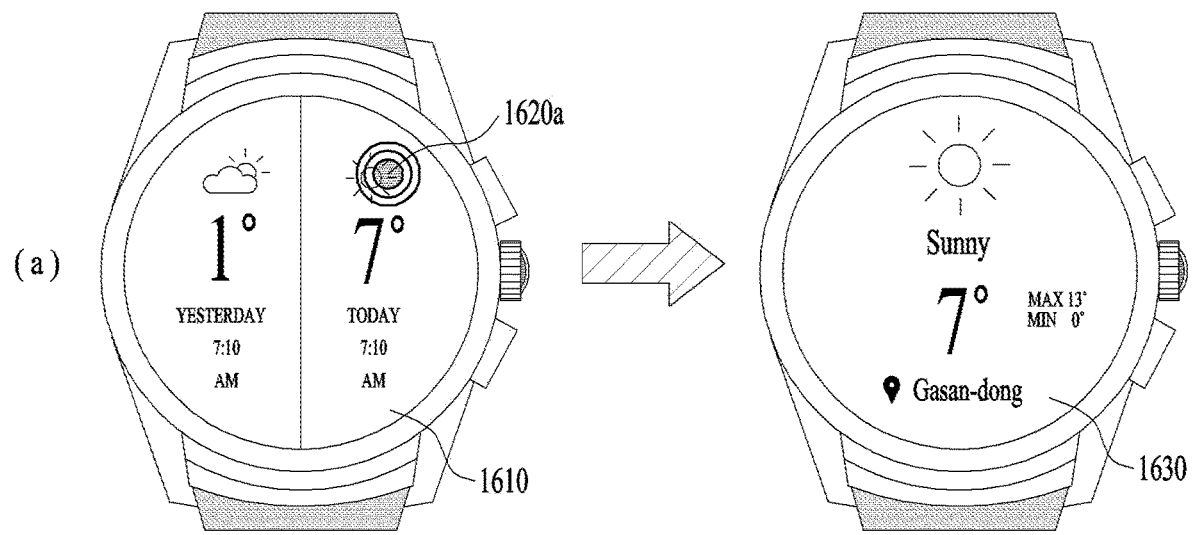
(a)
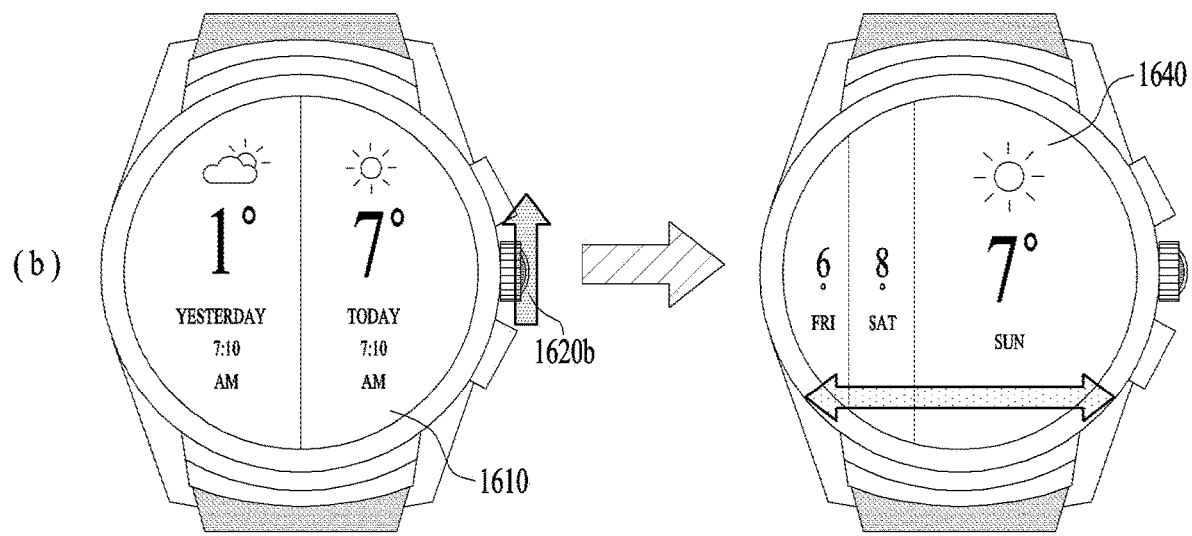
(b)

FIG. 18
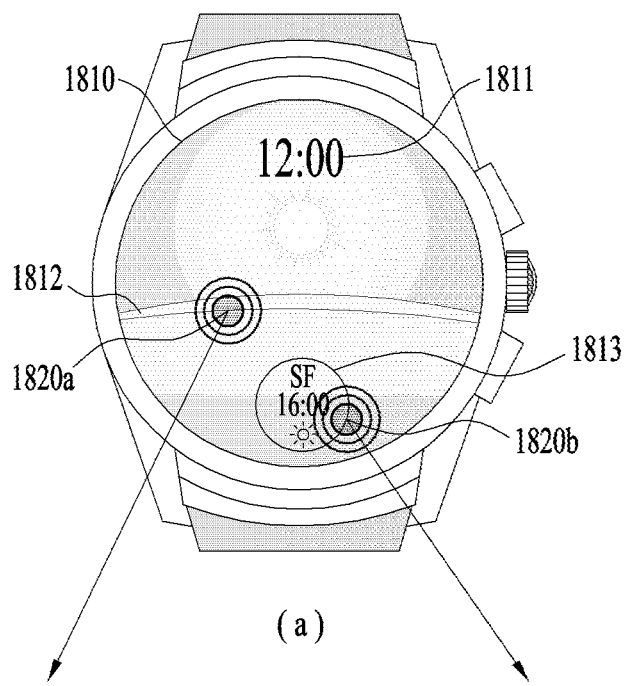
(a)
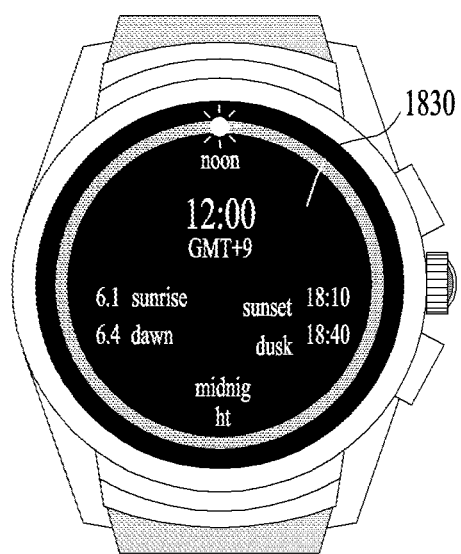
(b)
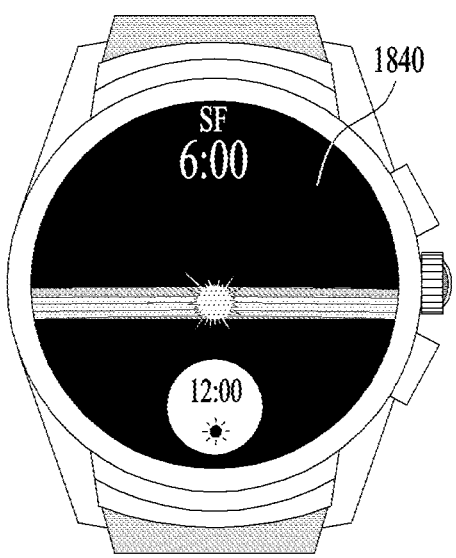
(c)

FIG. 29
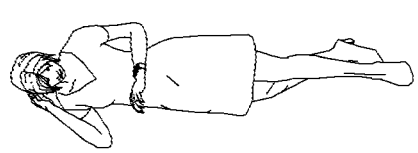
(a)
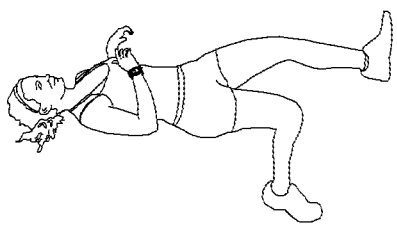
(b)
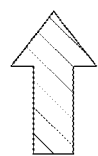
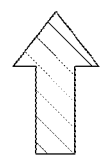
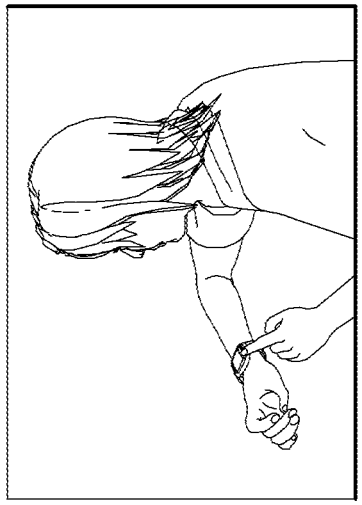
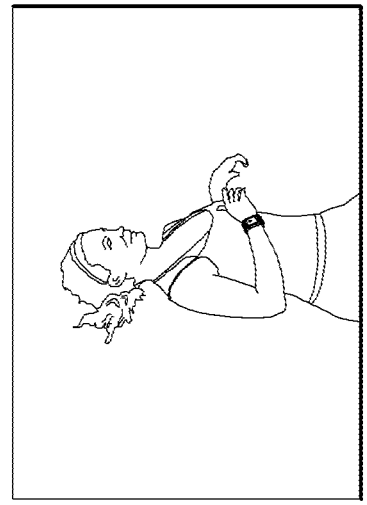

WATCH TYPE MOBILE TERMINAL AND METHOD FOR CONTROLLING THE SAME

CROSS REFERENCE TO RELATED APPLICATIONS

This application is a Continuation of U.S. application Ser. No. 15/340,464, filed on Nov. 1, 2016, which claims priority under 35 U.S.C. § 119(e) to U.S. Provisional Patent Application No. 62/039,434, filed on Mar. 16, 2016, and under 35 U.S.C. § 119(a) to Korean Application No. 10-2016-0067018, filed on May 31, 2016, the contents of which are hereby incorporated by reference herein in their entirety.

BACKGROUND OF THE INVENTION

Field of the Invention

The present invention relates to a watch-type mobile terminal configured to differently output information according to a type of an input signal input on a crown or a bezel part of the watch-type mobile terminal and a method of controlling therefor.

Discussion of the Related Art

A mobile terminal can perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. The mobile terminals can be further classified into handheld terminals and vehicle mounted terminals. There are ongoing efforts to support and increase the functionality of mobile terminals. Such efforts include software and hardware improvements, as well as changes and improvements in the structural components which form the mobile terminal.

Meanwhile, since a watch-type mobile terminal has a restriction of a narrow display space, it may be difficult to minutely control contents by a direct touch on a screen. Due to the device characteristic, a watch-type mobile terminal can sense not only an input signal directly input on a touch screen on which contents are output but also a control signal at a bezel part or a crown of the watch-type mobile terminal.

SUMMARY OF THE INVENTION

Accordingly, the present invention is directed to an apparatus and method thereof that substantially obviate one or more problems due to limitations and disadvantages of the related art.

An object of the present invention is to provide a watch-type mobile terminal capable of controlling contents output on a display unit in various ways and a method of controlling therefor.

Another object of the present invention is to provide a watch-type mobile terminal capable of providing different content according to a speed of a rotation input and a direction of the rotation input sensed on a crown or a bezel unit and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a watch-type mobile terminal includes a display unit, a bezel unit configured to form a rim of the display unit and contain a touch sensing unit, a crown, and a controller, the controller configured to sense a rotation input on at least one of the crown and the bezel unit when first content is output on the display unit, the controller configured to control second content associated with the first content to be output on the display unit in response to the rotation input.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 9 is a diagram illustrating an example of a method of providing contents according to a scroll speed of an input signal in a watch-type mobile terminal according to one embodiment of the present invention.

FIG. 16 is a diagram illustrating an example of a method of outputting weather in a watch-type mobile terminal according to one embodiment of the present invention.

FIG. 18 is a diagram illustrating a different example of a method of outputting a watch in a watch-type mobile terminal according to one embodiment of the present invention.

FIG. 29 is a diagram illustrating an example of a method of differently outputting contents according to angle information sensed on a watch-type mobile terminal according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
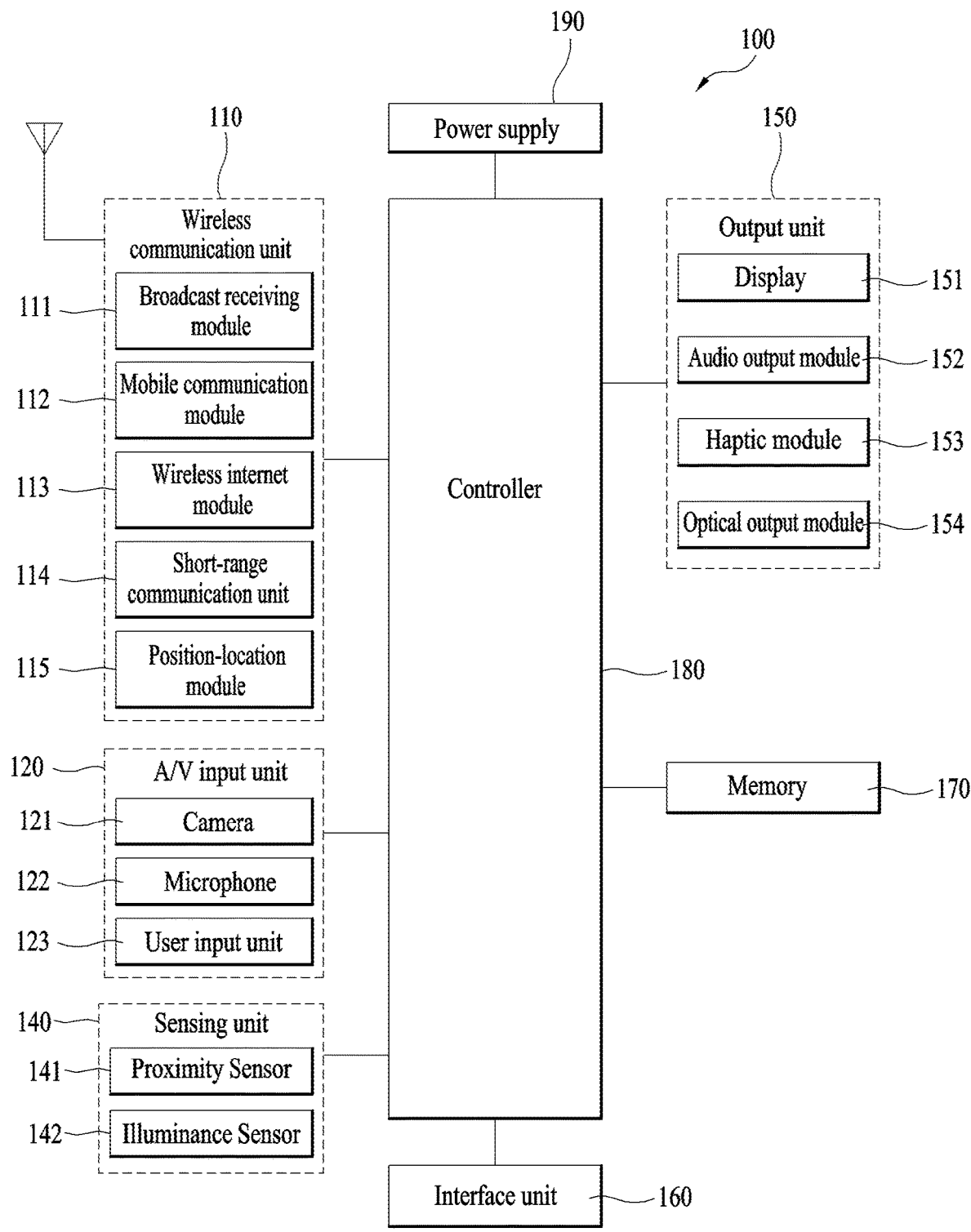
FIG. 1A is a block diagram of a mobile terminal according to an embodiment of the present disclosure.
Figure 1B:
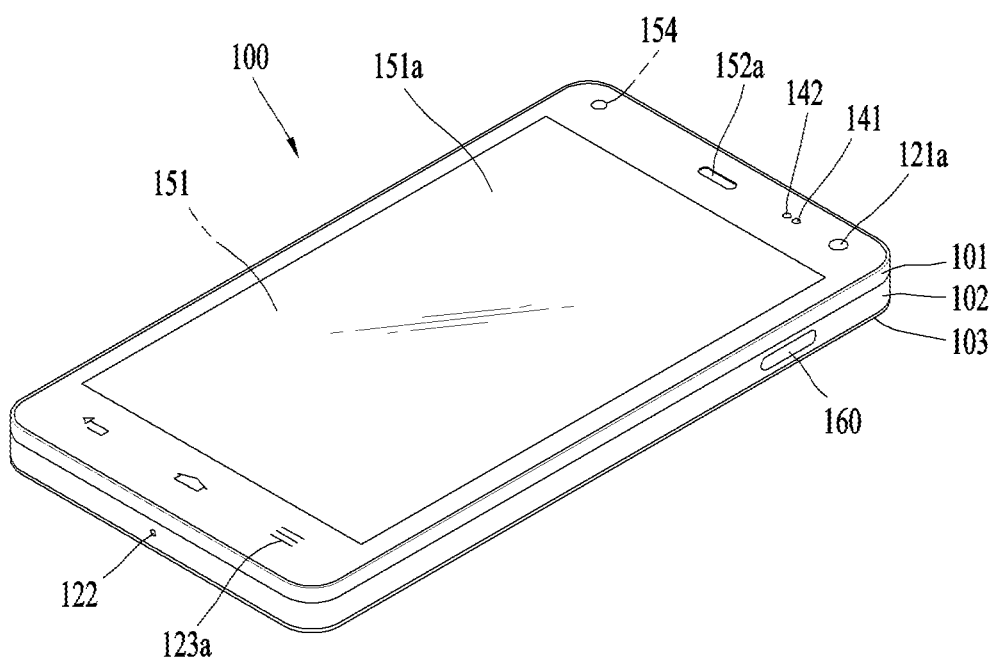
FIGS. 1B and 1C are conceptual views of one example of the mobile terminal, viewed from different directions.
Figure 1C:
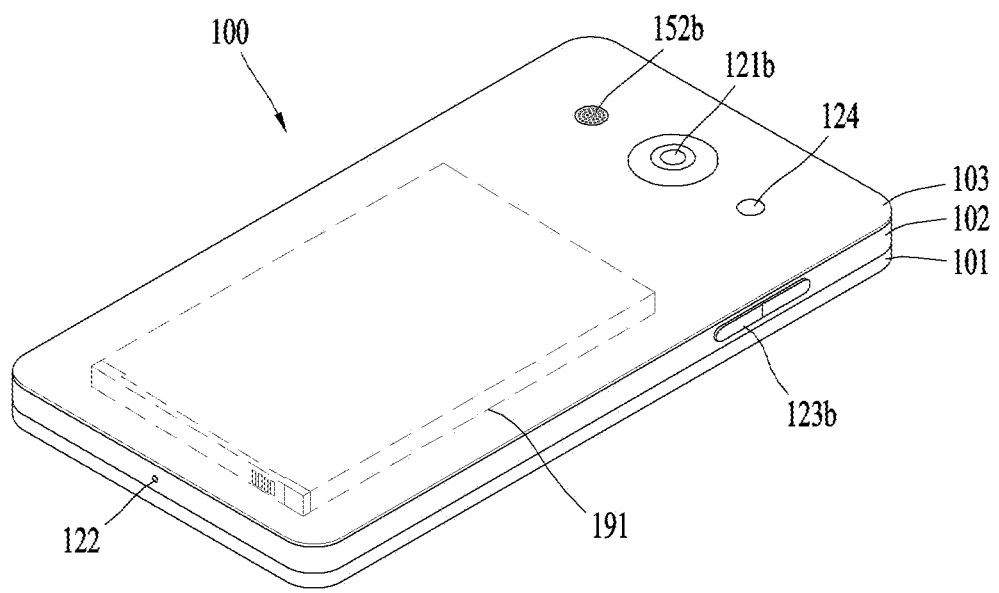

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or a function appropriate for a user by processing a signal, data, information and the like input or output via the aforementioned configuration elements or executing an application program stored in the memory 170.

The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least a part of the configuration elements can operate by cooperating with each other to implement an operation of a mobile terminal, control of the mobile terminal or a method of controlling the mobile terminal according to various embodiments described in the following. And, the operation of the mobile terminal, the control of the mobile terminal or the method of controlling the mobile terminal can be implemented on the mobile terminal by driving at least one or more application programs stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The mobile terminal 100 can include the display unit 151, the first and second audio output unit 152*a*/152*b*, the proximity sensor 141, the illumination sensor 142, the optical output unit 154, the first and second camera 121a/121b, the first and second operation unit 123a/123b, the microphone 122, the interface unit 160 and the like.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, according to an embodiment of the present invention, information processed in the mobile terminal can be displayed using a flexible display. In the following, this is explained in more detail with reference to the attached drawings.

Figure 2:
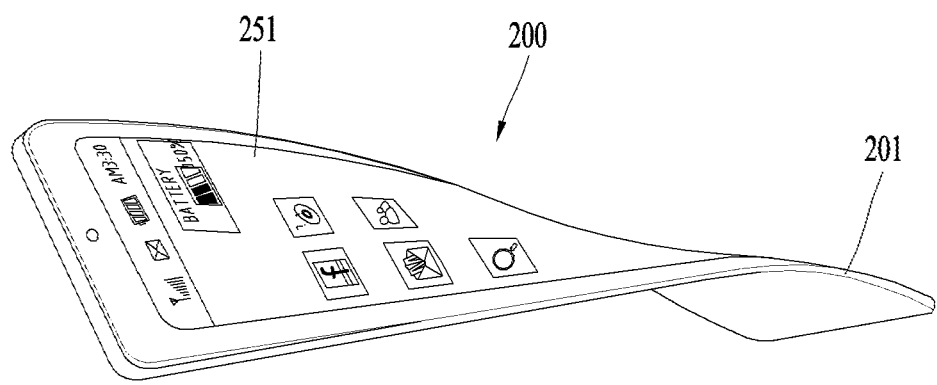
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 251 is not deformed (for example, in a state with an infinite radius of curvature and referred to as a first state), a display region of the flexible display unit 251 includes a generally flat surface. When the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140. The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251. A battery located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 can transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
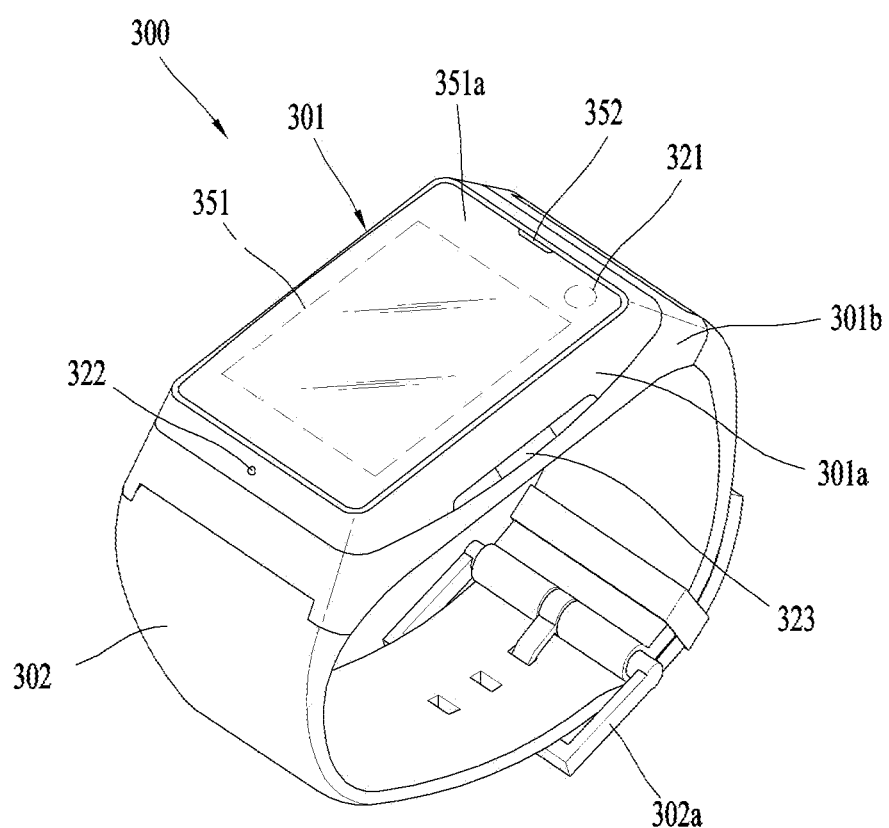
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion electrically connected to the antenna to extend a ground area. The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information. The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter. In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

When the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this instance, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Figure 4:
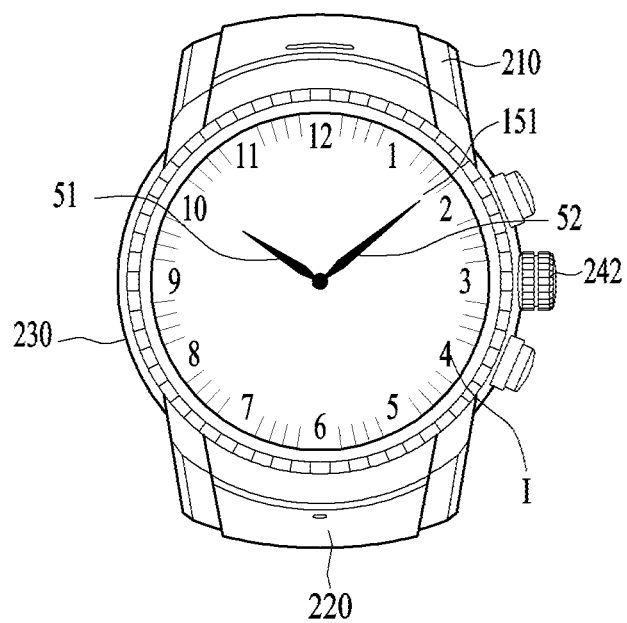
FIG. 4 is a perspective diagram illustrating a different example of a watch-type mobile terminal according to one embodiment of the present invention.

FIG. 4 is a perspective diagram illustrating a different example of a watch-type mobile terminal according to one embodiment of the present invention. A watch-type mobile terminal 200 can include a case 210 practically forming a body of the watch-type mobile terminal 200. The watch-type mobile terminal 200 can also include a band 220 connected to the case 210. The band 220 is configured to wrap a wrist by being worn on the wrist and the band can be made up of a flexible material to make a user easily wear the watch-type mobile terminal. For example, the band 220 may be made of fur, rubber, silicon, synthetic resin, or the like. The band 220 may also be configured to be detachable from the case 210. Accordingly, the band 220 may be replaceable with various types of bands according to a user's preference.

The watch-type mobile terminal 200 can include a bezel 230 installed on the case 210. The bezel 230 may be made up of a member of a ring shape and can be extended along a rim of the case 210. Hence, the bezel 230 can hold a separate glass or crystal member for protecting the display unit 151. The bezel 230 can be configured to provide a different function as well as the aforementioned protecting function and can also be used for the purpose of decoration. In the present invention, the bezel 230 can be used as a means of sensing a touch input of a user.

The display unit 151 of the watch-type mobile terminal 200 can directly display a number corresponding to present time. Similar to an analog watch, the display unit 151 can display a dial (or face) and hands. The watch-type mobile terminal 200 can include at least one or more hands 51/52 as a physical watch unit. The hands 51/52 can be made up of a physical member, more specifically, a member of a needle shape. Similar to a general analog watch, the hands 51/52 can be deployed at the center of the case 210. The hands 51/52 can be deployed at the center of the display unit 151 while being deployed at the center of the case 210 at the same time. In addition, the hand 51 may correspond to an hour hand and the hand 52 may correspond to a minute hand.

Similar to a general analog watch, the hands 51/52 can display present time to a user by indicating a letter or a scale. The display unit 151 can be configured to display a dial including an index (I) for displaying time. Hence, the hand 51 can display present time by indicating the index (I) of the display unit 151.

Meanwhile, the watch-type mobile terminal 200 can include a crown 242 as a part of a physical watch unit. The crown 242 is located at the side of the case 210. to the user can adjust or rotate the hands 51/52 by rotating the crown 242. If the crown 242 rotates, the hands 51/52 can be adjusted or rotated to provide functions different from a watch function. Further, the watch-type mobile terminal 200 can include a push button 211 as an input unit 120 (refer to FIG. 1A). The push button 211 can be deployed at the side of the case 210 by being adjacent to the crown 242.

Meanwhile, the hands 51/52 can also be used for providing a function of a smart device as well as a function of displaying time. Yet, in order for the hands 51/52 to provide the smart device function, it is necessary for the hands 51/52 to operate by being associated with other electronic parts. In particular, the hands 51/52 should be electrically and/or electronically controlled. More specifically, the hands 51/52, i.e., movement of the hands, should be controlled by an electrical and/or electronical signal provided by the controller 180. Hence, the hands 51/52 can be controlled based on an electromechanic system.

Figure 5:
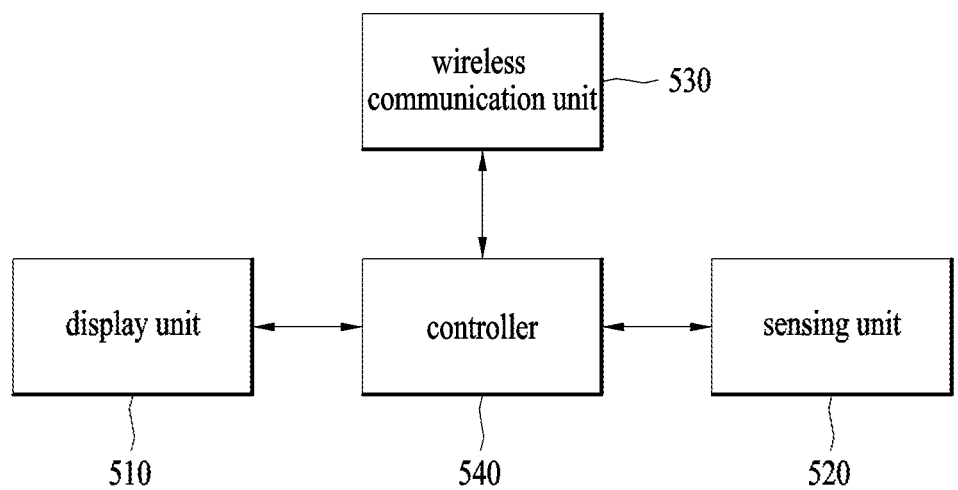
FIG. 5 is a block diagram illustrating a configuration module of a watch-type mobile terminal according to one embodiment of the present invention.

Next, FIG. 5 is a block diagram illustrating a configuration module of a watch-type mobile terminal according to one embodiment of the present invention. As shown, the watch-type mobile terminal can include a display unit 510, a sensing unit 520, a wireless communication unit 530, and a controller 540.

The display unit 510 can display visual information. In this instance, the visual information can include content, an application, an image, a video, an icon, and the like. Further, the display unit 510 can display information processed in the watch-type mobile terminal 200. For example, the display unit 510 basically outputs various images and text information and can display UI (user interface) and GUI (graphic user interface) according to information on an execution screen of an application program executed in the watch-type mobile terminal 200. Further, the display unit 510 can output visual information on a screen based on a control command of the controller 540.

The display unit 510 can include at least one selected from the group consisting of a liquid crystal display (LCD), a thin film transistor-liquid crystal display (TFT-LCD), an organic light emitting diode (OLED), a flexible display, a 3-dimensional (3D) display, and an e-ink display.

In the present invention, the display unit 510 can be implemented by the display 151 shown in FIG. 1A. According to one embodiment of the present invention, the display unit 510 can output first content. For example, the first content can include an execution screen of an application, an application list, a notification for notifying occurrence of an event, a watch, etc.

The sensing unit 520 senses various inputs of a user input on the watch-type mobile terminal 200 and environment of the watch-type mobile terminal 200 and delivers a sensed result to the controller 540 to enable the controller 540 to perform an operation according to the sensed result. In the present invention, the sensing unit 520 can be implemented by the sensing unit 140 or the input unit 120 shown in FIG. 1A. According to one embodiment of the present invention, the sensing unit 520 is installed in the bezel unit 230 and senses a drag touch input on the bezel unit 230. Further, according to one embodiment of the present invention, the sensing unit 520 is installed in the crown 242 and can sense a push input or a rotation input on the crown.

The wireless communication unit 530 performs communication using various protocols between a mobile terminal and an external device and can transmit and receive data. Further, the wireless communication unit 530 accesses a network in wired or in wireless and may be then able to transceive such digital data as contents and the like with the network. In the present invention, the wireless communication unit 530 can be implemented by the wireless communication unit 110 shown in FIG. 1A. According to one embodiment of the present invention, the wireless communication unit 530 can transceive a message and a phone call with an external device.

The controller 540 can process data, control each unit of the watch-type mobile terminal 200 and control data transceived between the units. In the present invention, the controller 540 can be implemented by the controller 180 shown in FIG. 1A. According to one embodiment of the present invention, if a first input signal is sensed on at least one of a crown and a bezel part while first content is output on the display unit 510, the controller 540 can control second content to be output on the display unit.

As an embodiment of the present invention, operations performed by a watch-type mobile terminal (hereinafter, a mobile terminal) can be controlled by the controller 540. Yet, for clarity, it is explained as the operations are commonly performed by the mobile terminal in the following description. In the following, a method of providing various contents according to an input signal sensed on a mobile terminal is explained via embodiments of FIGS. 6 to 29.

Figure 6:
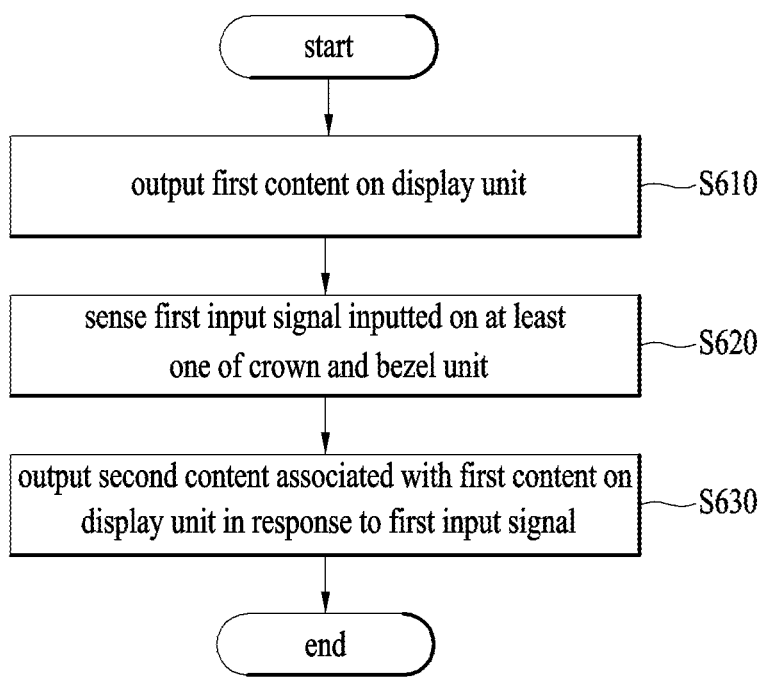
FIG. 6 is a flowchart illustrating a method of controlling a watch-type mobile terminal according to one embodiment of the present invention.

In particular, FIG. 6 is a flowchart illustrating a method of controlling a watch-type mobile terminal according to one embodiment of the present invention. As shown, the mobile terminal can output first content on a display unit (S610). In this instance, the first content can include an execution screen of an application, an application list, a notification of an event, default content such as a watch and the like. Further, the mobile terminal can output the first content in an activated state.

Subsequently, the mobile terminal can sense a first input signal input on at least one of a crown and a bezel unit (S620). In this instance, the first input signal may correspond to an input for rotating the crown or a touch drag input on the bezel unit.

Subsequently, the mobile terminal can control second content associated with the first content to be output on the display unit in response to the first input signal (S630). In this instance, the second content can be determined based on at least one of a speed of the first input signal, direction of the first input signal and a type of the first content.

As an example, the mobile terminal can control different second content to be output according to whether or not the speed of the first input signal belongs to a predetermined speed range. As a different example, the mobile terminal can control different second content to be output according to whether the speed of the first input signal corresponds to first direction or second direction. As a further different example, the mobile terminal can control different second content to be output according to whether the first content corresponds to an application list, a contact list, a watch, weather, a notification or the like. This will be described later with reference to embodiments of FIGS. 8 to 29.

UI Change According to Scroll Speed

As mentioned in the foregoing description, according to an embodiment of the present invention, the mobile terminal can sense an input signal via the bezel unit 230 or the crown 242. For example, the input signal input via the bezel unit 230 may correspond to a drag touch input that moves along the bezel unit. In addition, the input signal input via the crown 242 may correspond to a push input on the crown 242 or an input for rotating the crown 242.

In this instance, the drag touch input on the bezel unit 230 and the input for rotating the crown 242 may correspond to an input including speed. Hence, the mobile terminal can provide a different user interface according to a speed of scrolling the bezel unit 230 or the crown 242. In the following, examples of providing a different result according to a speed of an input signal sensed on the bezel unit or the crown are explained with reference to FIGS. 7 to 11.

Figure 7:
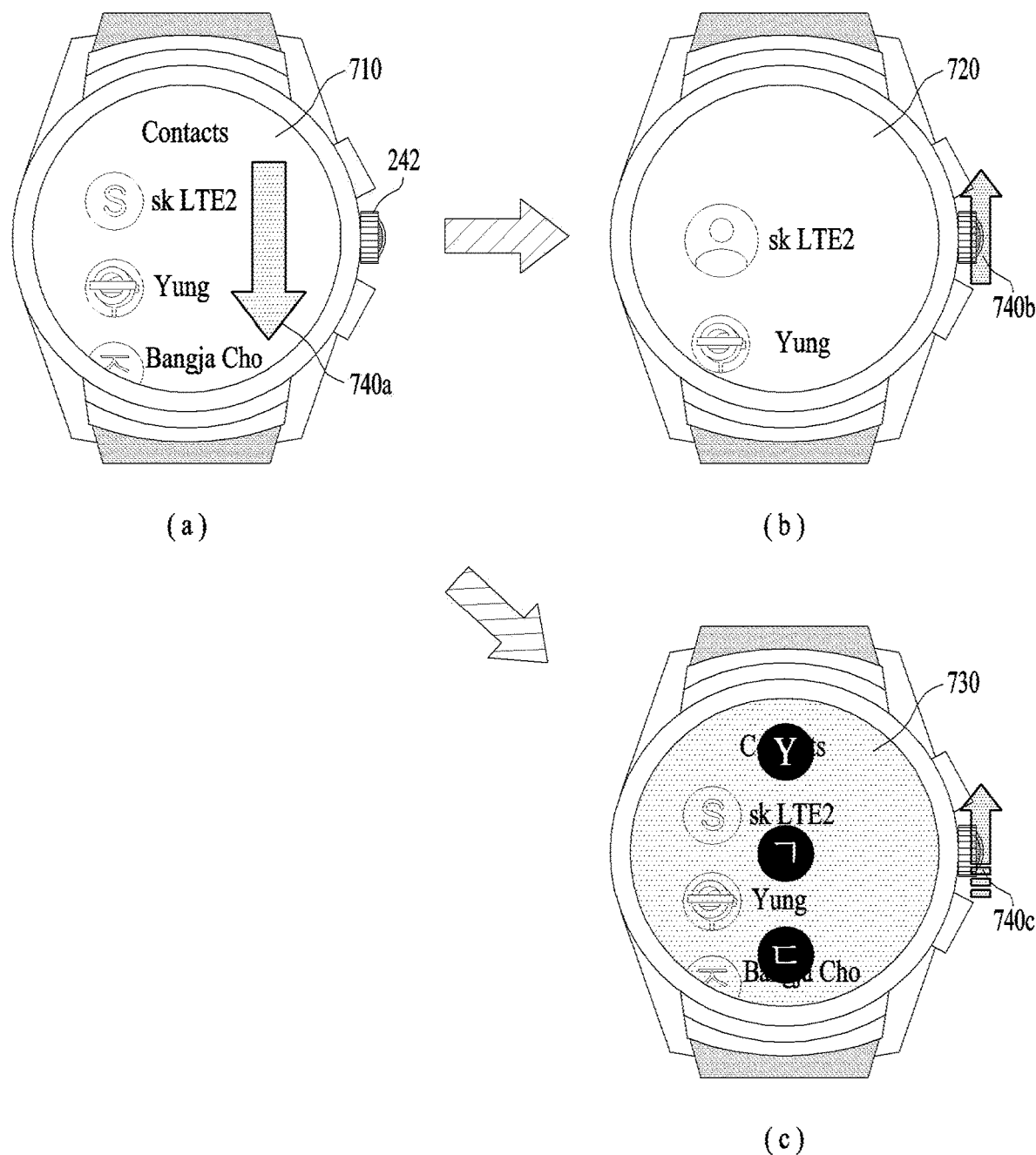
FIG. 7 is a diagram illustrating a method of providing contents according to a scroll speed of an input signal in a watch-type mobile terminal according to one embodiment of the present invention.

FIG. 7 is a diagram illustrating a method of providing contents according to a scroll speed of an input signal in a watch-type mobile terminal according to one embodiment of the present invention. More specifically, FIG. 7 shows a method of outputting different content according to a rotating input of which a speed is different when a list is output as an execution screen of a specific application in a mobile terminal.

Referring to FIG. 7(*a*), the mobile terminal can output a contact list 710 on the display unit when a contact application is executed. In this instance, due to a constraint of a size of the display unit, a partial contact is output only among the whole of contacts. In this instance, the mobile terminal can sense a first input signal 740*a* input on the display unit. In this instance, the first input signal 740*a* may correspond to a drag touch input on the display unit in one direction. By doing so, the mobile terminal can scroll the contact list 710 to search for a contact. Yet, in case of a drag touch touched on a touch screen, it may be inefficient for searching for a great amount of contacts.

In this instance, the mobile terminal can sense an input signal input on the crown 242. The input signal may correspond to an input signal for outputting a different execution screen rather than the basic contact list in the contact application.

As an example, the mobile terminal can sense a first rotation input 740*b* input on the crown 242. In this instance, the first rotation input 740*b* may correspond to an input for rotating the crown 242 with a first speed in one direction. For example, in FIG. 7(*b*), the first rotation input 740*b* may correspond to an input for slowly rotating the crown 242 in up direction. As shown in FIG. 7(*b*), the mobile terminal can control a favorite list 720 to be output on the contact application.

As a different example, the mobile terminal can sense a second rotation input 740*c* input on the crown 242. In this instance, the second rotation input 740*c* may correspond to an input for rotating the crown 242 with a second speed in one direction. The second speed corresponds to a speed faster than the aforementioned first speed. The second speed corresponds to a speed faster than a predetermined speed. For example, in FIG. 7(*c*), the second rotation input 740*c* may correspond to an input for quickly rotating the crown 242 in up direction. As shown in FIG. 7(*c*), the mobile terminal can control a quick scroll pop-up 730 for easily searching for a contact to be output on the contact list of the contact application.

Meanwhile, although it is explained as a different UI is provided according to a speed of a rotation input on the crown 242 in the present embodiment, it is apparent that the present embodiment can also be applied to a case that a speed of a drag touch input on the bezel unit 230 is different from each other. Further, although a rotation input on the crown 242 in one direction is explained in the present embodiment, it is apparent that the present embodiment can also be applied to a rotation input of an opposite direction.

Figure 8:
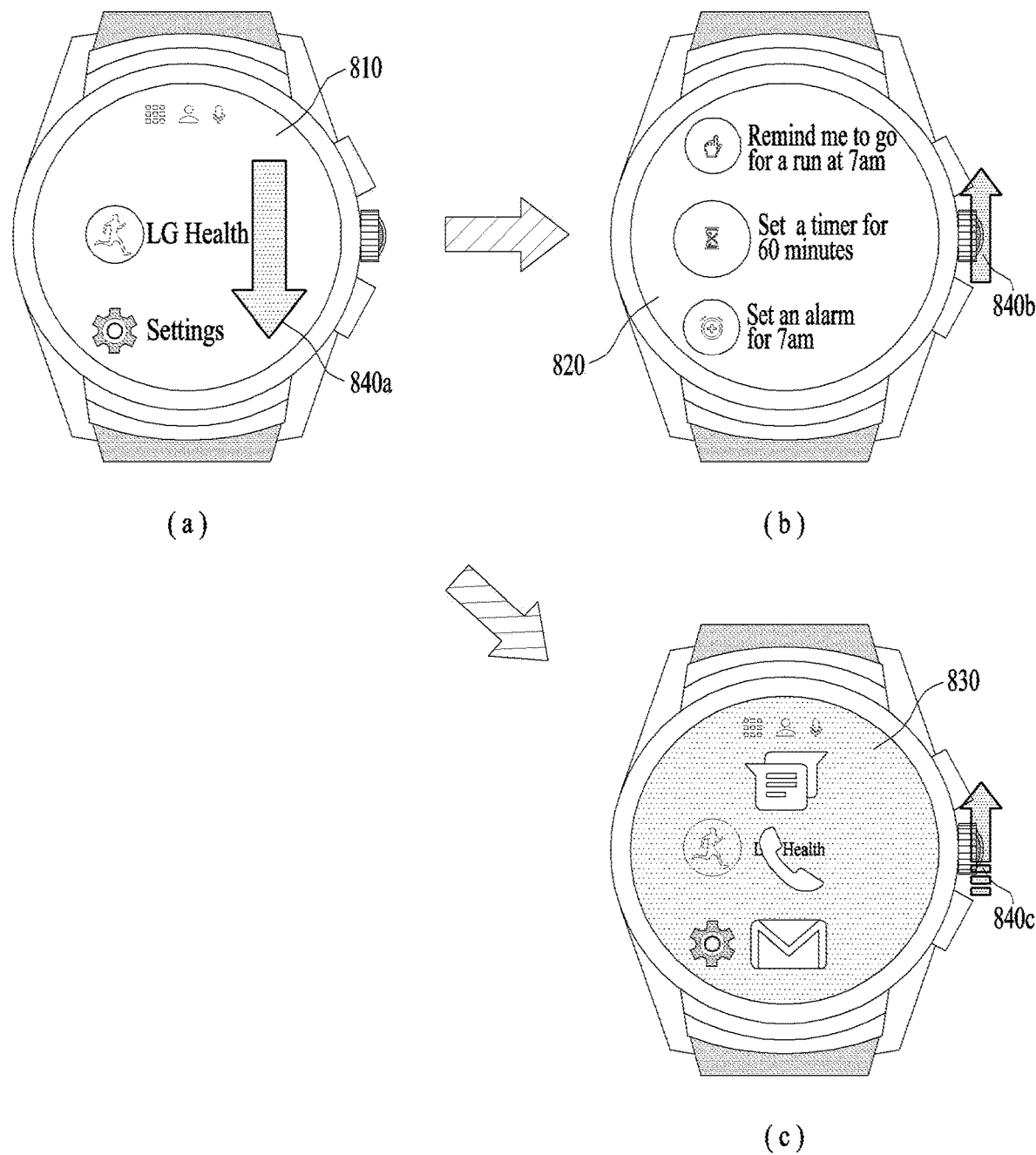
FIG. 8 is a diagram illustrating a method of providing contents according to a scroll speed of an input signal in a watch-type mobile terminal according to one embodiment of the present invention.

Next, FIG. 8 is a diagram illustrating a method of providing contents according to a scroll speed of an input signal in a watch-type mobile terminal according to one embodiment of the present invention. More specifically, FIG. 8 shows a method of outputting different content when a rotation input of a different speed is sensed when an application list is output in a mobile terminal. Explanation on contents overlapped with the contents of FIG. 7 is omitted in embodiments of FIG. 8.

Referring to FIG. 8(*a*), the mobile terminal can output an application list 810 on the display unit. In this instance, due to a constraint of a size of the display unit of the mobile terminal, a partial application is output only among the whole of applications. The mobile terminal can sense an input signal 840*a* input on the display unit. Further, the input signal 840*a* may correspond to a drag touch input on the display unit in one direction. By doing so, the mobile terminal can scroll the application list 810 to search for an application.

In this instance, the mobile terminal can sense an input signal input on the crown 242. The input signal may correspond to a signal for executing a function configured by a user or a function set to the mobile terminal in advance rather than the application list.

As an example, the mobile terminal can sense a first rotation input 840*b* input on the crown 242. In this instance, the first rotation input 840*b* may correspond to an input for rotating the crown 242 with a first speed in one direction. As shown in FIG. 8(*b*), the mobile terminal can activate a voice recognition function. For example, if a voice input of a user is sensed after the first rotation input 840*a* is sensed, the mobile terminal can perform a configured function according to the voice input.

As a different example, the mobile terminal can sense a second rotation input 840*c* input on the crown 242. In this instance, the second rotation input 840*c* may correspond to an input for rotating the crown 242 with a second speed in one direction. As shown in FIG. 8(*c*), the mobile terminal can control a recently used application list pop-up 830 to be output on the application list.

Meanwhile, although it is explained as a different UI is provided according to a speed of a rotation input on the crown 242 in the present embodiment, it is apparent that the present embodiment can also be applied to a case that a speed of a drag touch input on the bezel unit 230 is different from each other. Further, although a rotation input on the crown 242 in one direction is explained in the present embodiment, it is apparent that the present embodiment can also be applied to a rotation input of an opposite direction.

FIG. 9 is a diagram illustrating an example of a method of providing contents according to a scroll speed of an input signal in a watch-type mobile terminal according to one embodiment of the present invention. More specifically, FIG. 9 shows a method of providing a different UI in response to a rotation input of a continuous identical speed range when a notification on an occurred event is output on a mobile terminal.

First of all, referring to FIG. 9(a), the mobile terminal can control a simple notification 910 to be output on the display unit. In this instance, the simple notification 910 may correspond to a simple notification notifying existence of an occurred event. For example, if an event occurs in the middle of executing a different application, the mobile terminal can stop the currently executed application and control the simple notification 910 notifying the occurred event to be output.

Further, for example, if an input signal for checking the notification is sensed, the mobile terminal can control the simple notification 910 notifying the occurred event to be output. For example, the occurred event can include various events, which are received or occurred in the watch-type mobile terminal, such as message reception, phone call reception, e-mail reception, alarm and the like.

In this instance, the mobile terminal can sense a first input signal 951. The first input signal may correspond to an input for checking a notification in more detail. For example, the first input signal may correspond to a drag touch input 951a input on the bezel unit 230 in one direction with a first speed. Further, for example, the first input signal may correspond to an input 951b for rotating the crown 242 in one direction with the first speed. In this instance, the first speed may correspond to a speed belonging to a predetermined speed range.

As shown in FIG. 9(b), the mobile terminal can control a normal notification 920 to be output in response to the first input signal. In addition, the normal notification 920 may correspond to a notification notifying a type of an occurred event or content of the occurred event.

Subsequently, a user may intend to check detail information on the checked normal notification 920. In this instance, the mobile terminal can sense a second input signal 952. The second input signal may correspond to an input for checking the notification in more detail. For example, the second input signal may correspond to a drag touch input 952b input on the bezel unit 230 in one direction with a first speed. Further, for example, the first input signal may correspond to an input 952b for rotating the crown 242 in one direction with the first speed. In this instance, the first speed may correspond to a speed belonging to a predetermined speed range.

In this instance, as shown in FIG. 9(c), the mobile terminal can control a detail notification 930 to be output in response to the second input signal. In addition, the detail notification 930 may correspond to a notification notifying an event output when an application corresponding to the occurred event is executed.

Subsequently, a user may be unable to check the occurred event at a time due to a constraint of a size of the display unit even when an actual application is executed. In this instance, the mobile terminal can sense a third input signal 953. The third input signal 953 may correspond to an input for scrolling. For example, the third input signal 953 may correspond to an input 953a input on the bezel unit 230 or an input 953b input on the crown 242. Further, the third input signal 953 may be identical to the aforementioned first input signal 951 or the second input signal 952.

As shown in FIG. 9(d), the mobile terminal can control a scrolled detail notification 940 to be output in response to the third input signal 953. By doing so, a user can easily check content of a notification without being restricted by a size of the display unit. Although a rotation input on the crown 242 or the bezel unit 230 in one direction is explained in the present embodiment, it is apparent that the present embodiment can also be applied to a rotation input of an opposite direction.

Figure 10:
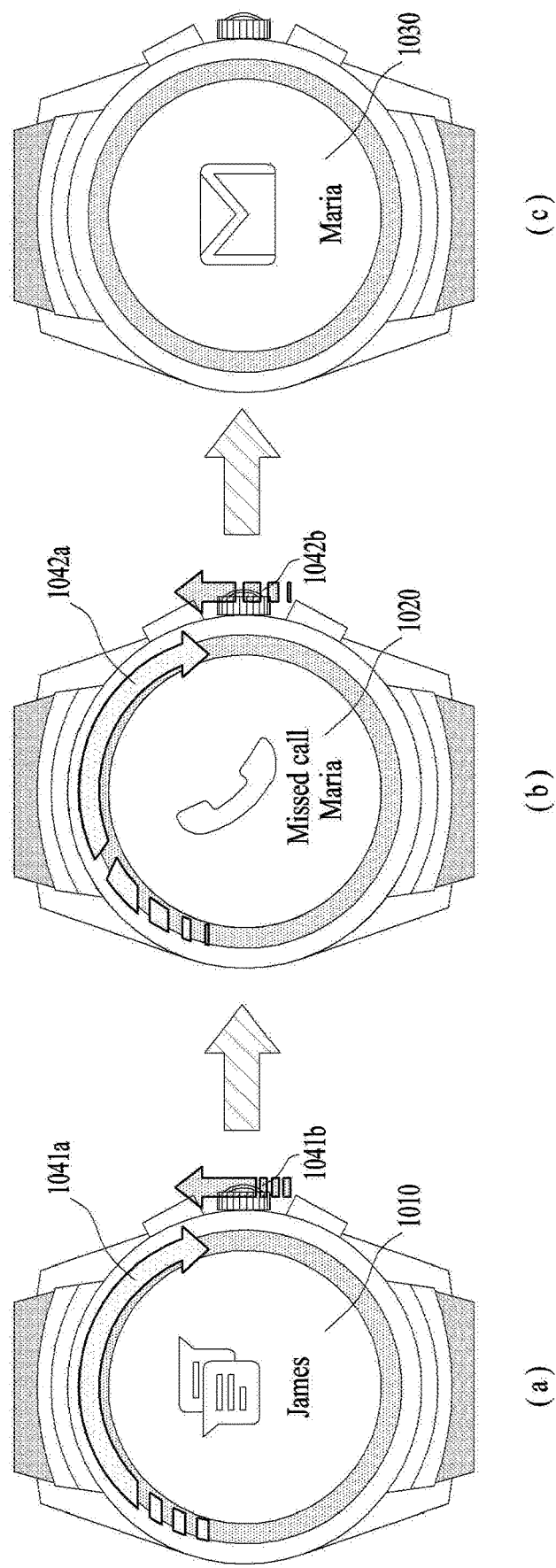
FIG. 10 is a diagram illustrating an example of a method of providing contents according to a scroll speed of an input signal in a watch-type mobile terminal according to one embodiment of the present invention.

FIG. 10 is a diagram illustrating an example of a method of providing contents according to a scroll speed of an input signal in a watch-type mobile terminal according to one embodiment of the present invention. More specifically, FIG. 10 shows a method of providing a different UI in response to a rotation input of a continuous identical speed range when a notification on an occurred event is output on the mobile terminal. Explanation on contents overlapped with the contents of FIG. 9 is omitted in embodiments of FIG. 10.

First of all, referring to FIG. 10(a), the mobile terminal can control a first notification 1010 to be output on the display unit. For example, the first notification 1010 may correspond to a notification on a received message. In this instance, a user may intend to check a different notification rather than the first notification 1010.

In addition, the mobile terminal can sense a first input signal 1041. For example, the first input signal may correspond to a drag touch input 1041a input on the bezel unit 230 in one direction with a second speed. Further, for example, the first input signal 1041 may correspond to an input 1041b for rotating the crown 242 in one direction with the second speed. In this instance, the second speed may correspond to a speed faster than a predetermined speed range. In particular, the second speed of FIG. 10 may correspond to a speed faster than the first speed mentioned earlier in FIG. 9.

As shown in FIG. 10(b), the mobile terminal can control a second notification 1020 to be output in response to the first input signal 1041. In this instance, the second notification 1020 corresponds to a notification different from the first notification 1010 and may correspond to a notification on a missed call. Meanwhile, the second notification 1020 may correspond to a different message or a different sender as a notification on an application identical to the first notification 1010. Further, a user may intend to check a different notification rather than the first 1010 and the second notification 1020.

In this instance, the mobile terminal can sense a second input signal 1042. For example, the second input signal 1042 may correspond to a drag touch input 1042a input on the bezel unit 230 in one direction with a second speed. Further, for example, the second input signal 1042 may correspond to an input 1042b for rotating the crown 242 in one direction with the second speed.

As shown in FIG. 10(c), the mobile terminal can control a third notification 1030 to be output in response to the second input signal 1042. In addition, the third notification 1030 corresponds to a notification different from the first 1010 and the second notification 1020 and may correspond to a notification on a received mail. By doing so, a user can easily and continuously check a plurality of notifications.

Meanwhile, unlike the aforementioned embodiments of FIGS. 9 and 10, the mobile terminal can provide a different notification according to a rotation input of a first speed, and provide a detail notification according to a rotation input of a second speed. Further, the embodiments of FIGS. 9 and 10 can also be implemented by being combined with each other. For example, the mobile terminal can sense a rotation input of the second speed immediately after a rotation input of the first speed is sensed.

Figure 11:
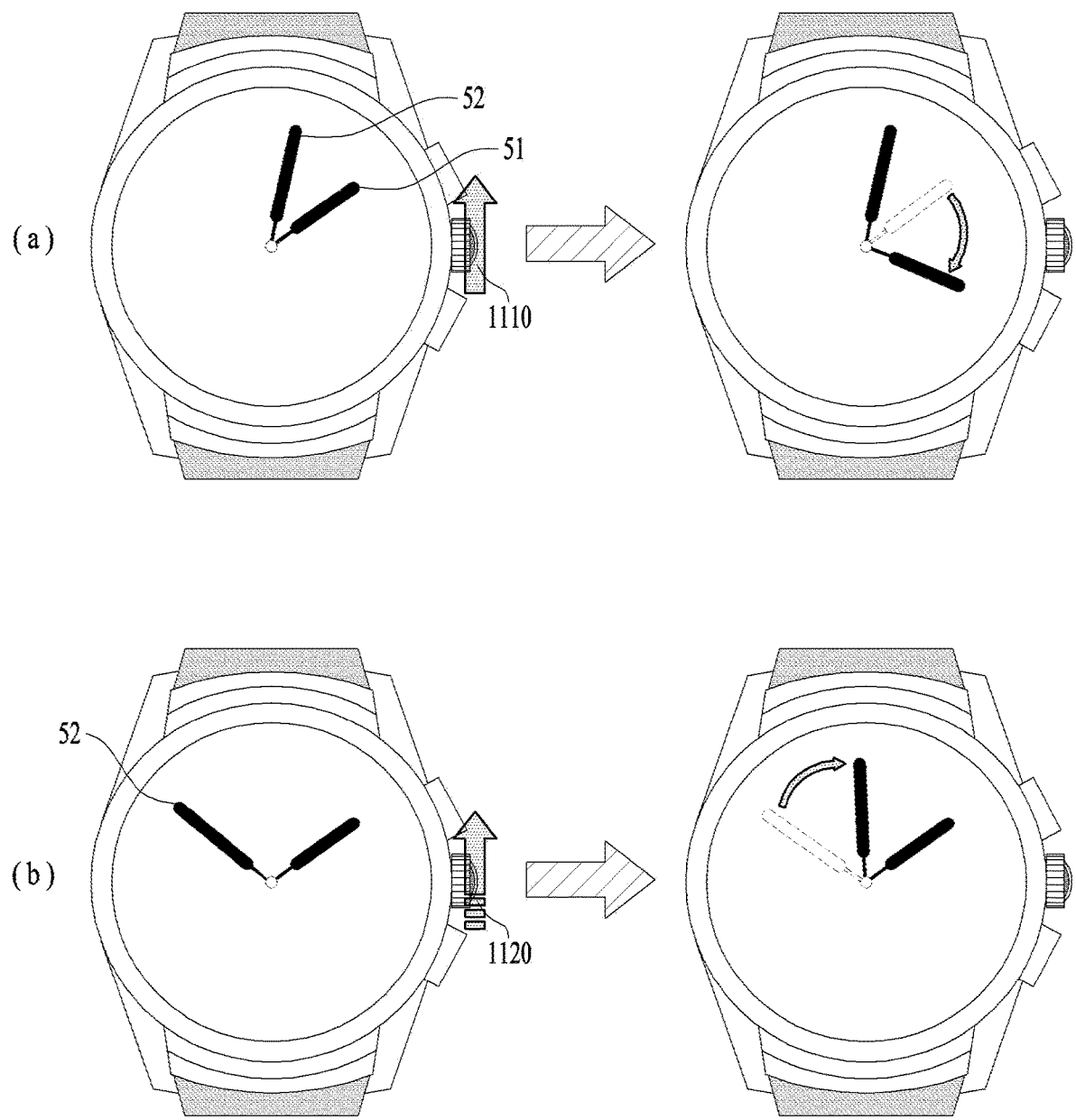
FIG. 11 is a diagram illustrating an example of a method of setting alarm according to a scroll speed of an input signal in a watch-type mobile terminal according to one embodiment of the present invention.

Next, FIG. 11 is a diagram illustrating an example of a method of setting alarm according to a scroll speed of an input signal in a watch-type mobile terminal according to one embodiment of the present invention. More specifically, FIG. 11 shows a method of setting hour and minute of alarm according to a speed of a rotation input. As mentioned earlier in FIG. 4, the mobile terminal can include an hour hand 51 and a minute hand 52. For example, the hour hand 51 and the minute hand 52 may correspond to a physical member or a graphic effect.

The mobile terminal may be in a state of executing an alarm application or a state of entering an alarm setting mode. For example, when a trigger signal (not depicted) is sensed in a watch mode indicating present time via the hour hand 51 and the minute hand 52, the watch mode is switched to the alarm setting mode. The alarm setting using the hour hand and the minute hand may correspond to a case of easily setting alarm in the middle of cooking or exercising.

In this instance, referring to FIG. 11(a), the mobile terminal can sense a first input signal 1110. For example, the first input signal 1110 may correspond to an input for rotating the crown 242 in one direction with a first speed. In addition, the mobile terminal can move the hour hand 51 in response to the first input signal 1110. A moving distance of the hour hand 51 can be determined based on the number of rotation, a rotation angle, the extent of rotation, rotation time, and the like of the crown 242. Further, if prescribed time elapses after the first input signal 1110 ends, the mobile terminal can finish setting of the hour hand of the alarm.

Meanwhile, referring to FIG. 11(b), the mobile terminal can sense a second input signal 1120. For example, the second input signal 1120 may correspond to an input for rotating the crown 242 in one direction with a second speed. In this instance, the second speed corresponds to a speed faster than the first speed, and the mobile terminal can move the minute hand 52 in response to the second input signal 1120. A moving distance of the minute hand 52 can be determined based on the number of rotation, a rotation angle, the extent of rotation, rotation time, and the like of the crown 242. Further, if prescribed time elapses after the second input signal 1120 ends, the mobile terminal can finish setting of the minute hand of the alarm.

Based on the aforementioned embodiments, a user can promptly set an alarm using an easy and simple method while using the mobile terminal as a watch. In the aforementioned embodiments, although it is assumed that the first speed is slower than the second speed, it is apparent that the mobile terminal can also be implemented in an opposite way. Further, although it is written as an input signal is sensed on the crown in the embodiment of FIG. 11, it is apparent that the input signal can also be sensed on the bezel unit.

UI Change According to Scroll Speed and Scroll Direction

In the following, examples of providing a different UI according to a speed and a direction of an input signal sensed on the bezel unit or the crown are explained with reference to FIGS. 12 and 13. In embodiments of FIGS. 12 and 13, assume that the mobile terminal is outputting a watch and weather on a display unit at the same time. Further, assume that an hour hand and a minute hand output in FIGS. 12 and 13 correspond to digital hands rather than analog hands.

Figure 12:
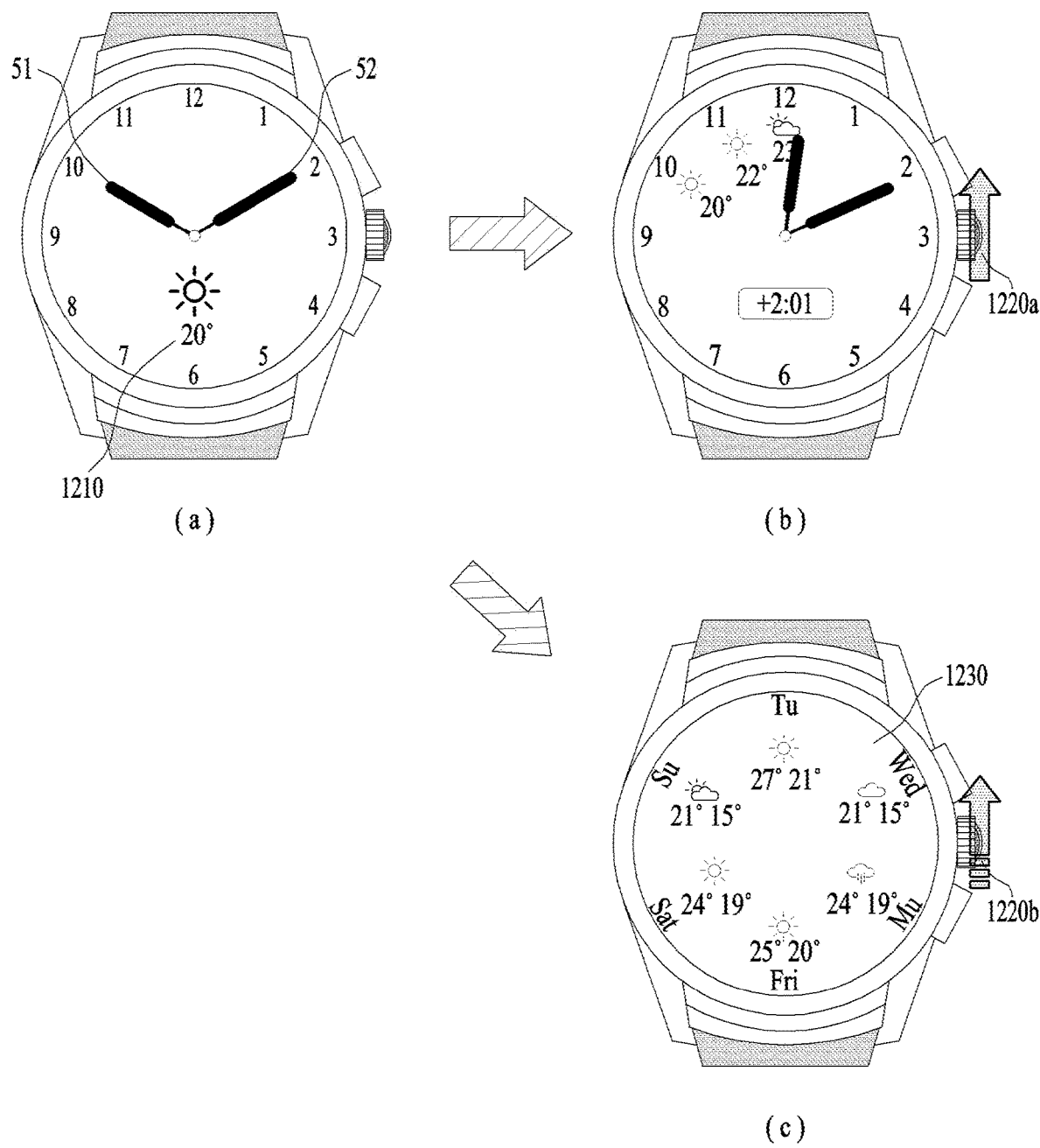
FIG. 12 is a diagram illustrating an example of a method of providing different contents according to a speed and direction of an input signal in a watch-type mobile terminal according to one embodiment of the present invention.
Figure 13:
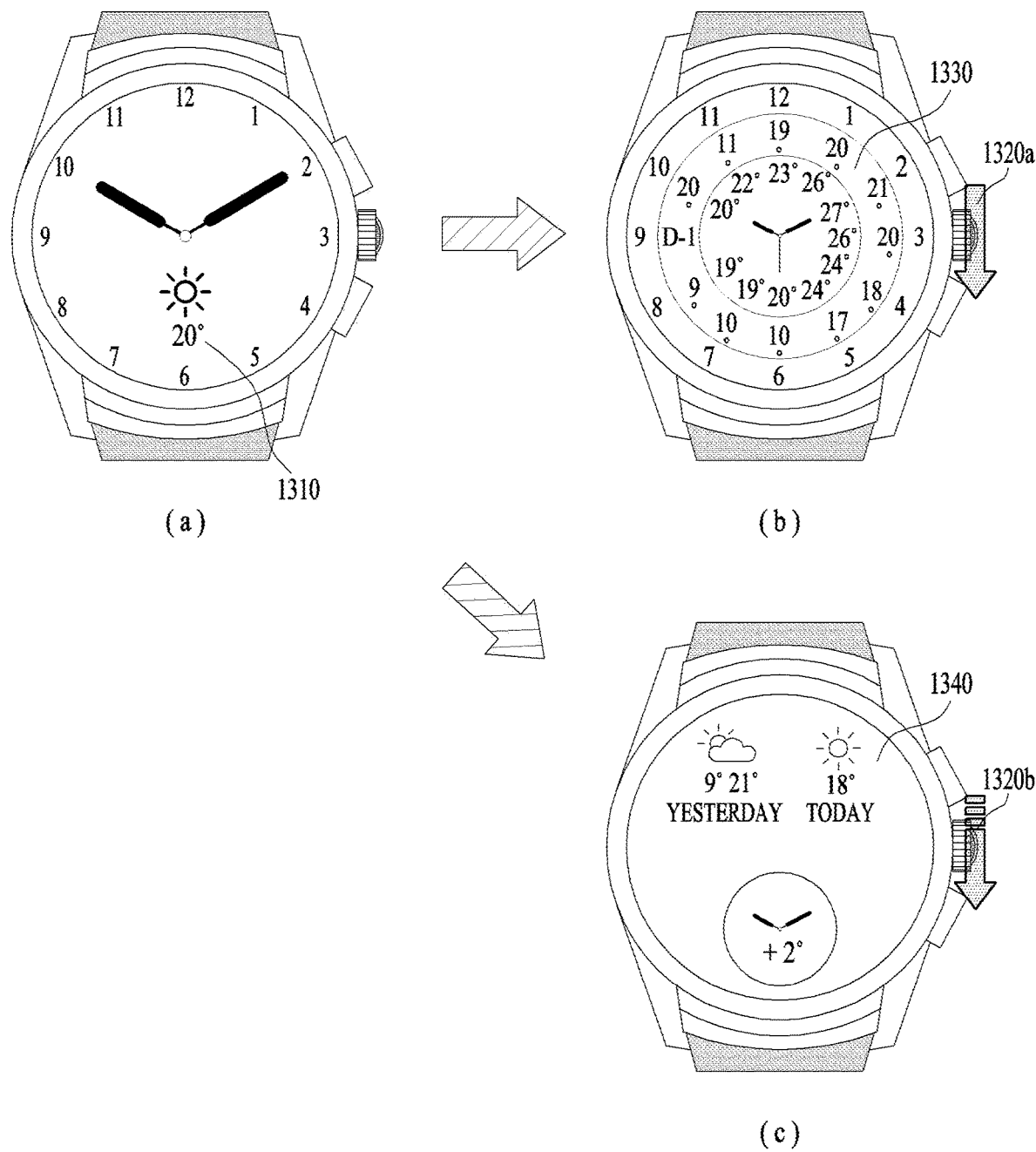
FIG. 13 is a diagram illustrating an example of a method of providing different contents according to a speed and direction of an input signal in a watch-type mobile terminal according to one embodiment of the present invention.

In the embodiments of FIGS. 12 and 13, assume that a first direction and a second direction correspond to up direction and down direction, respectively. Further, assume that a first speed corresponds to a speed slower than a second speed and the first speed belongs to a predetermined speed range.

FIG. 12 is a diagram illustrating an example of a method of providing different contents according to a speed and direction of an input signal in a watch-type mobile terminal according to one embodiment of the present invention. More specifically, FIG. 12 shows a method of outputting future information via a rotation input on a crown in a first direction.

First of all, referring to FIG. 12(a), the mobile terminal outputs present time via an hour hand 51 and a minute hand 52 and can control current weather 1210 to be output on a predetermined area of the display unit. In this instance, referring to FIG. 12(b), the mobile terminal can sense a first input signal 1220a for rotating the crown 242 in a first direction with a first speed. The mobile terminal can change positions of the hour hand 51 and the minute hand 52 according to the rotation of the crown 242.

In addition, the changed positions of the hour hand 51 and the minute hand 52 can be determined based on a rotation distance, the number of rotations, and the like of the crown 242. Further, the mobile terminal can sequentially display anticipated weather corresponding to a position of the hour hand 51 or a position of the minute hand 52 according to the rotation of the crown 242. The mobile terminal can also output a time change amount on a predetermined area.

Further, referring to FIG. 12(c), the mobile terminal can sense a second input signal 1220b for rotating the crown 242 in a first direction with a second speed. In this instance, the mobile terminal eliminates the output hour hand 51 and the minute hand 52 from the display unit and can control daily weather 1230 to be output on the display unit.

FIG. 13 is a diagram illustrating an example of a method of providing different contents according to a speed and direction of an input signal in a watch-type mobile terminal according to one embodiment of the present invention. More specifically, FIG. 13 shows a method of outputting past information via a rotation input on a crown in a second direction.

First of all, referring to FIG. 13(a), the mobile terminal outputs present time via an hour hand 51 and a minute hand 52 and can control current weather 1310 to be output on a predetermined area of the display unit. In this instance, referring to FIG. 13(b), the mobile terminal can sense a first input signal 1320a for rotating the crown 242 in a second direction with a first speed. The mobile terminal can control hourly information 1330 on yesterday's weather and today's weather to be output according to the rotation of the crown 242. The mobile terminal can also eliminate the hour hand 51 and the minute hand 52 from the display unit.

Further, referring to FIG. 13(c), the mobile terminal can sense a second input signal 1320b for rotating the crown 242 in a second direction with a second speed. In this instance, the mobile terminal can control overall comparison information 1340 on yesterday's weather and today's weather to be output according to the rotation of the crown 242. The mobile terminal can stop outputting the hour hand 51 and the minute hand 52.

According to the aforementioned embodiment, a user can easily check a weather change in the mobile terminal according to a time slot. Further, unlike the aforementioned embodiments of FIGS. 12 and 13, the second speed may correspond to a speed slower than the first speed. Although it is written as an input signal is sensed on the crown in the embodiments of FIGS. 12 and 13, it is apparent that the input signal can also be sensed on the bezel unit.

Rotation Input and Voice Input on Crown

Figure 14:
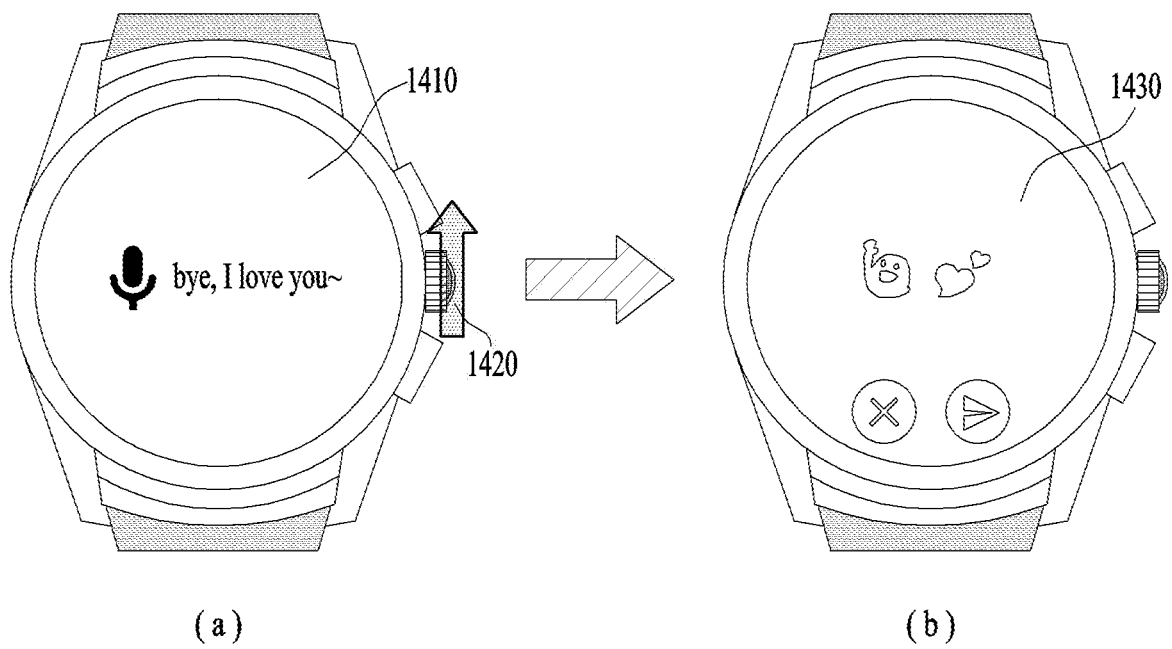
FIG. 14 is a diagram illustrating an example of a method of outputting configured contents when a rotation input is sensed in a voice recognition mode of a watch-type mobile terminal according to one embodiment of the present invention.
Figure 15:
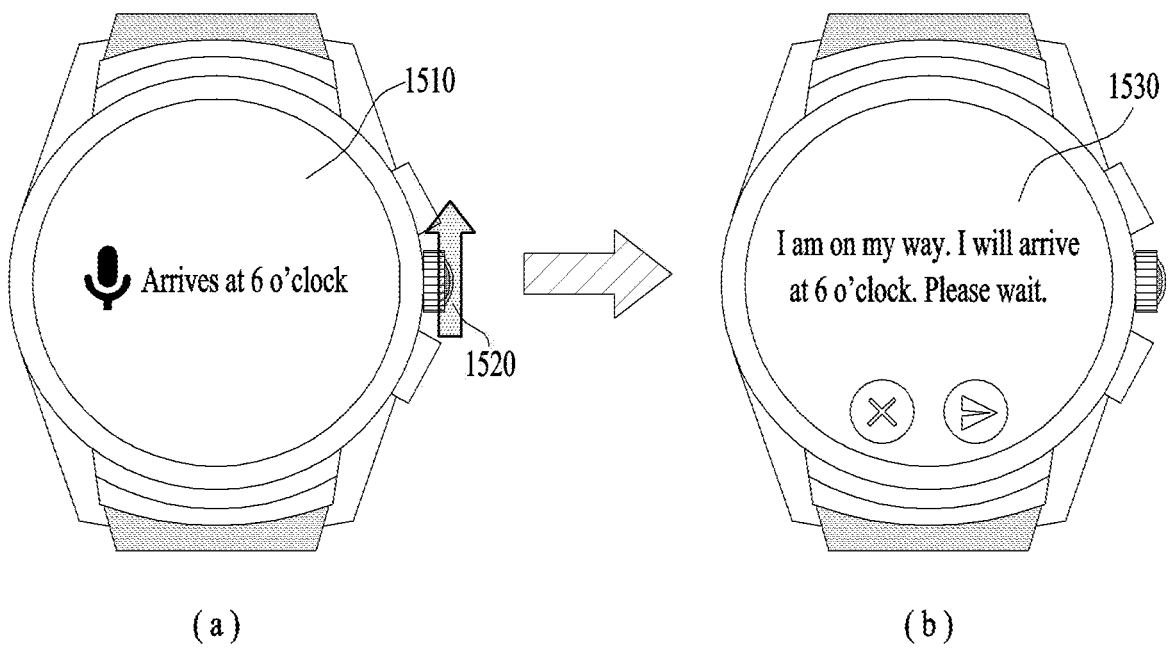
FIG. 15 is a diagram illustrating an example of a method of outputting configured contents when a rotation input is sensed in a voice recognition mode of a watch-type mobile terminal according to one embodiment of the present invention.

FIGS. 14 and 15 in the following show a method of providing different content based on a sensed voice input in case of sensing a rotation input on the crown in a voice recognition mode. In embodiments of FIGS. 14 and 15, assume a state that the mobile terminal has entered the voice recognition mode. For example, if a trigger signal is sensed in an activated state or a deactivated state of the mobile terminal, the mobile terminal can enter the voice recognition mode.

First of all, FIG. 14 is a diagram illustrating an example of a method of outputting configured contents when a rotation input is sensed in a voice recognition mode of a watch-type mobile terminal according to one embodiment of the present invention. More specifically, FIG. 14 shows a method of automatically outputting an emoticon based on a voice input in case of sensing a rotation input on the crown 242 in the voice recognition mode of the mobile terminal.

Referring to FIG. 14(a), the mobile terminal senses such a voice input 1410 as 'bye, I love you' in the voice recognition mode and can sense a rotation input 1420. The voice input 1410 and the rotation input 1420 can be sensed at the same time or can be sequentially sensed. Further, the mobile terminal senses the voice input 1410, performs STT (speech-to-text) conversion on the voice input, and can recognize contents of the converted text. Further, the rotation input 1420 may correspond to a signal for asking to switch the converted text into an emoticon. For example, the rotation input 1420 may correspond to an input for rotating the crown 242 in one direction more than a prescribed angle.

In this instance, as shown in FIG. 14(b), the mobile terminal can control an emoticon 1430 to be output based on the content of the text. As shown in FIG. 14(b), if the output emoticon 1430 is matched with an intention of a user, the user can transmit the emoticon to a counterpart by touching a send button on the display unit. If the output emoticon 1430 is not matched with the intention of the user, the user can terminate transmission of the emoticon by touching a cancel button on the display unit.

Based on the present embodiment, a user can easily use an emoticon via a voice input and rotation of the crown without an effort of searching and setting an emoticon to input an emoticon preferred by the user. Meanwhile, although a rotation input by rotating the crown is explained in the present embodiment, it is apparent that a rotation input on the bezel unit by a drag touch input is also available.

FIG. 15 is a diagram illustrating an example of a method of outputting configured contents when a rotation input is sensed in a voice recognition mode of a watch-type mobile terminal according to one embodiment of the present invention.

More specifically, FIG. 15 shows a method of automatically outputting a sentence based on a voice input of a word in case of sensing a rotation input on the crown 242 in the voice recognition mode of the mobile terminal. Explanation on contents overlapped with the aforementioned contents of FIG. 14 is omitted in the embodiment of FIG. 15.

Referring to FIG. 15(a), the mobile terminal senses such a voice input 1510 as 'arrives at 6 o'clock' in the voice recognition mode and can sense a rotation input 1520. The voice input 1510 and the rotation input 1520 can be sensed at the same time or can be sequentially sensed. Further, the mobile terminal senses the voice input 1510, performs STT (speech-to-text) conversion on the voice input, and can recognize contents of the converted text. The rotation input 1520 may correspond to an input for completing a sentence based on a word included in the converted text.

In this instance, as shown in FIG. 15(b), the mobile terminal can control a sentence 1530 to be output based on the content of the text. The mobile terminal can complete a sentence based on a usual language pattern of a user via an IA (intelligent agent) mounted on the mobile terminal or an IA of an external server connected with the mobile terminal. More specifically, the mobile terminal extracts a voice pattern of a user and can control a sentence including a word to be output based on the extracted voice pattern.

In this instance, as shown in FIG. 15(b), if the output sentence 1530 is matched with an intention of a user, the user can transmit the sentence to a counterpart by touching a send button on the display unit. If the output sentence 1530 is not matched with the intention of the user, the user can terminate transmission of the sentence by touching a cancel button on the display unit.

Based on the present embodiment, a user can easily complete a sentence matched with an intention of the user in the watch-type mobile terminal where input of a letter is not easy due to a size of the display unit. Meanwhile, although a rotation input by rotating the crown is explained in the present embodiment, it is apparent that a rotation input on the bezel unit by a drag touch input is also available.

Meanwhile, the rotation input 1420 mentioned earlier in FIG. 14 and the rotation input 1520 mentioned earlier in FIG. 15 may correspond to rotation inputs different from each other. Hence, the mobile terminal can provide a different content in response to an identical voice input. As an example, a speed of the rotation input 1420 may be faster than a speed of the rotation input 1520. As a different example, a rotation angle of the rotation input 1420 may be greater than a rotation angle of the rotation input 1520. Further, the rotation inputs 1420/1520 can also be distinguished from each other via various methods rather than the aforementioned embodiments.

Other Various UIs Provided by Watch-Type Mobile Terminal

Various UIs output in the watch-type mobile terminal of the present invention are explained in the following with reference to FIGS. 16 to 29. First of all, FIG. 16 is a diagram illustrating an example of a method of outputting weather in a watch-type mobile terminal according to one embodiment of the present invention.

More specifically, FIG. 16 shows a method of additionally providing a different weather content according to an input signal on a default screen on which today's weather and tomorrow's weather are displayed. Referring to FIG. 16(a), if a tap input 1620a input on a today's weather is sensed on a default screen 1610, the mobile terminal can control a detail screen 1630 of the today's weather to be output. The detail screen 1630 can be output by being overlaid on the default screen 1610.

Referring to FIG. 16(b), if a rotation input 1620b is sensed when the default screen 1610 is output, the mobile terminal can control a weekly weather list 1640 to be output. In this instance, since a part of the weekly weather is output only due to a size of the display unit, a user can check the weekly weather on the display unit via a scroll input.

Figure 17:
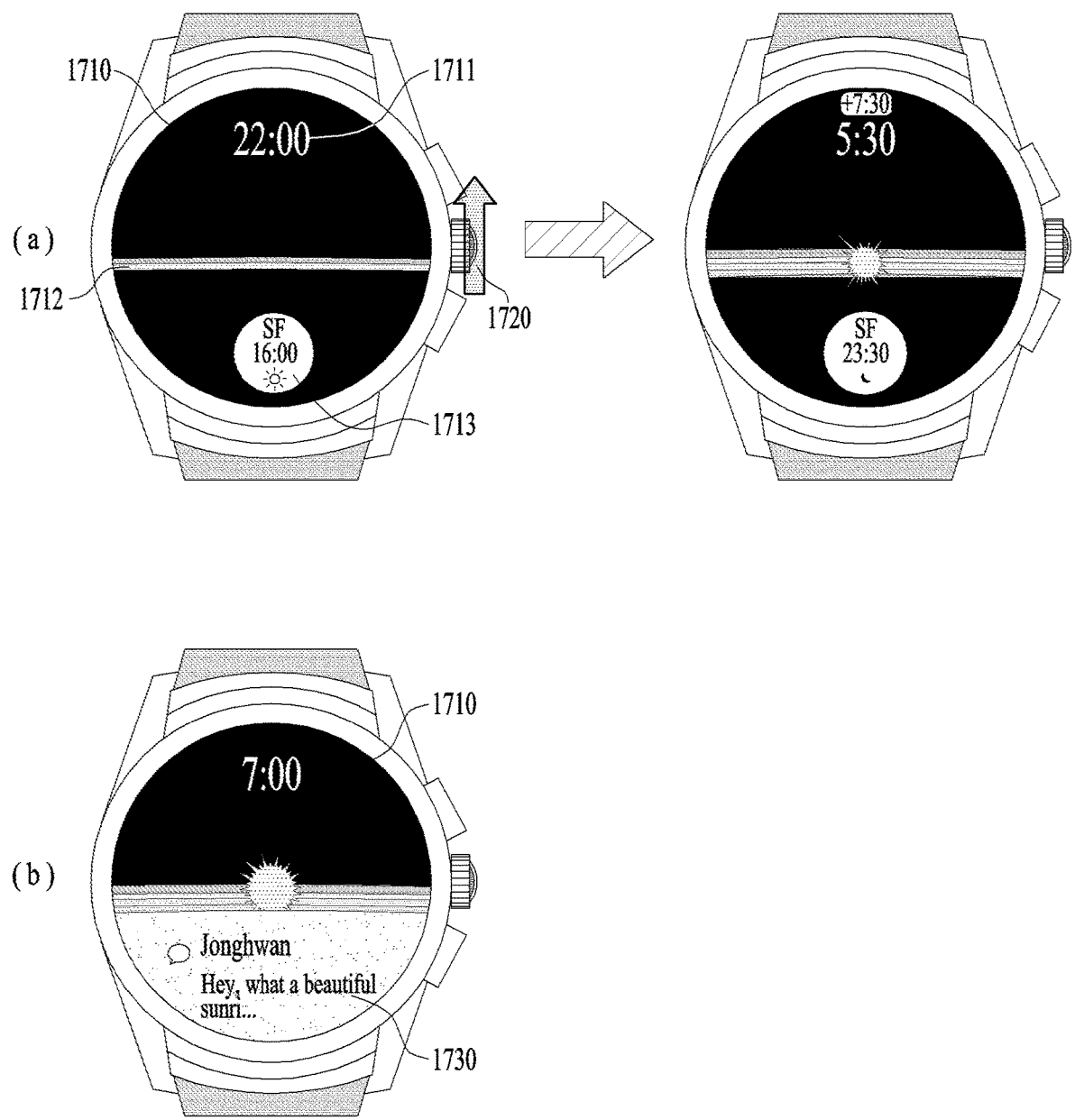
FIG. 17 is a diagram illustrating an example of a method of outputting a watch in a watch-type mobile terminal according to one embodiment of the present invention.

FIG. 17 is a diagram illustrating an example of a method of outputting a watch in a watch-type mobile terminal according to one embodiment of the present invention. More specifically, FIG. 17 shows a method of providing a different screen according to an input signal or event occurrence on a screen on which a watch and a status of the sun are displayed.

Referring to FIG. 17(a), the mobile terminal outputs watch content 1710 indicating time of a current location. For example, the watch content 1710 can include time of a current location 1711, a graphic effect 1712 indicating a current status of the sun, and time and weather 1713 of a predetermined location. The mobile terminal can sense a rotation input 1720 input on the crown 242. The rotation input 1720 may correspond to an input for checking a future status or a past status based on present time. For example, in the embodiment of FIG. 17 (*a*), the rotation input 1720 corresponds to an input for rotating the crown 242 in up direction and may correspond to a rotation angle corresponding to time after 7 hours and 30 minutes.

The mobile terminal can control watch content of 7 hours and 30 minutes later based on present time to be output in response to the rotation input 1720. Referring to a second screen of FIG. 17(*b*), time 1711 of a current location, a graphic effect 1712 and time and weather 1713 of a predetermined location can be output based on changed time.

Meanwhile, referring to FIG. 17(*b*), the mobile terminal can receive an event such as a message in the middle of outputting the watch content 1710. The mobile terminal can output a notification 1730 at a predetermined area of the watch content 1710 for prescribed time by overlaying the notification on the watch content.

FIG. 18 is a diagram illustrating a different example of a method of outputting a watch in a watch-type mobile terminal according to one embodiment of the present invention. More specifically, FIG. 18 shows a method of providing a different screen according to a location at which a tap input is sensed in a screen on which a watch and a status of the sun are displayed. In embodiment of FIG. 18, contents overlapped with the contents mentioned earlier in FIG. 17 are omitted.

Referring to FIG. 18(*a*), the mobile terminal can output a watch content 1810 indicating time of a current location. For example, the watch content 1810 can include time 1811 of a current location, a graphic effect 1812 indicating a current status of the sun, and time and weather 1813 of a predetermined location. As an example, the mobile terminal can sense a first tap input 1820*a* input on the graphic effect 1812. In this instance, as shown in FIG. 18(*b*), the mobile terminal can control a screen 1830 on which sunrise/sunset time of today are displayed to be output.

As a different example, the mobile terminal can sense a second tap input 1820*b* input on the time and weather 1813 of the predetermined location. As shown in FIG. 18 (*c*), the mobile terminal can control a watch content 1840 of a predetermined location to be output on the display unit.

Figure 19:
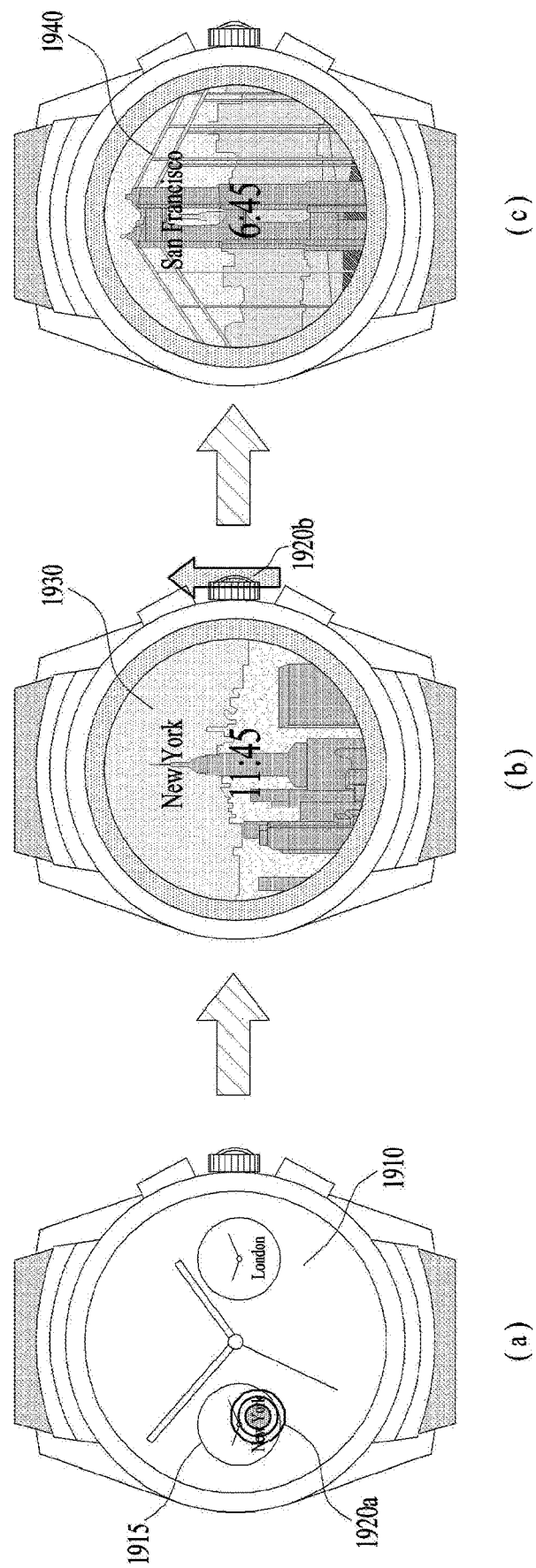
FIG. 19 is a diagram illustrating a further different example of a method of outputting a watch in a watch-type mobile terminal according to one embodiment of the present invention.

FIG. 19 is a diagram illustrating a further different example of a method of outputting a watch in a watch-type mobile terminal according to one embodiment of the present invention. More specifically, FIG. 19 shows a method of outputting various contents according to an input signal in a watch screen on which not only time of a current location but also time of a predetermined location are provided at the same time.

First of all, referring to FIG. 19(*a*), the mobile terminal can sense a first input signal 1920*a* when a watch content 1910 is output on the display unit. In embodiment of FIG. 19, the watch content can output not only time of a current location but also time of a first location and a second location at the same time. More specifically, the mobile terminal can sense a first input signal 1920*a* input on a watch of the first location included in the watch content 1910.

The mobile terminal can control detail information 1930 on the first location to be output in response to the first input signal 1920*a*. Referring to FIG. 19(*b*), the mobile terminal can output current time of the first location on an image indicating the first location.

Further, the mobile terminal can sense a second input signal 1920*b*. For example, the second input signal 1920*b* may correspond to a rotation input on the crown 242 or the bezel unit 230. As shown in FIG. 19(*c*), the mobile terminal can control detail information 1940 on the second location to be output. Referring to FIG. 19(*c*), the mobile terminal can output current time of the second location on an image indicating the second location.

Figure 20:
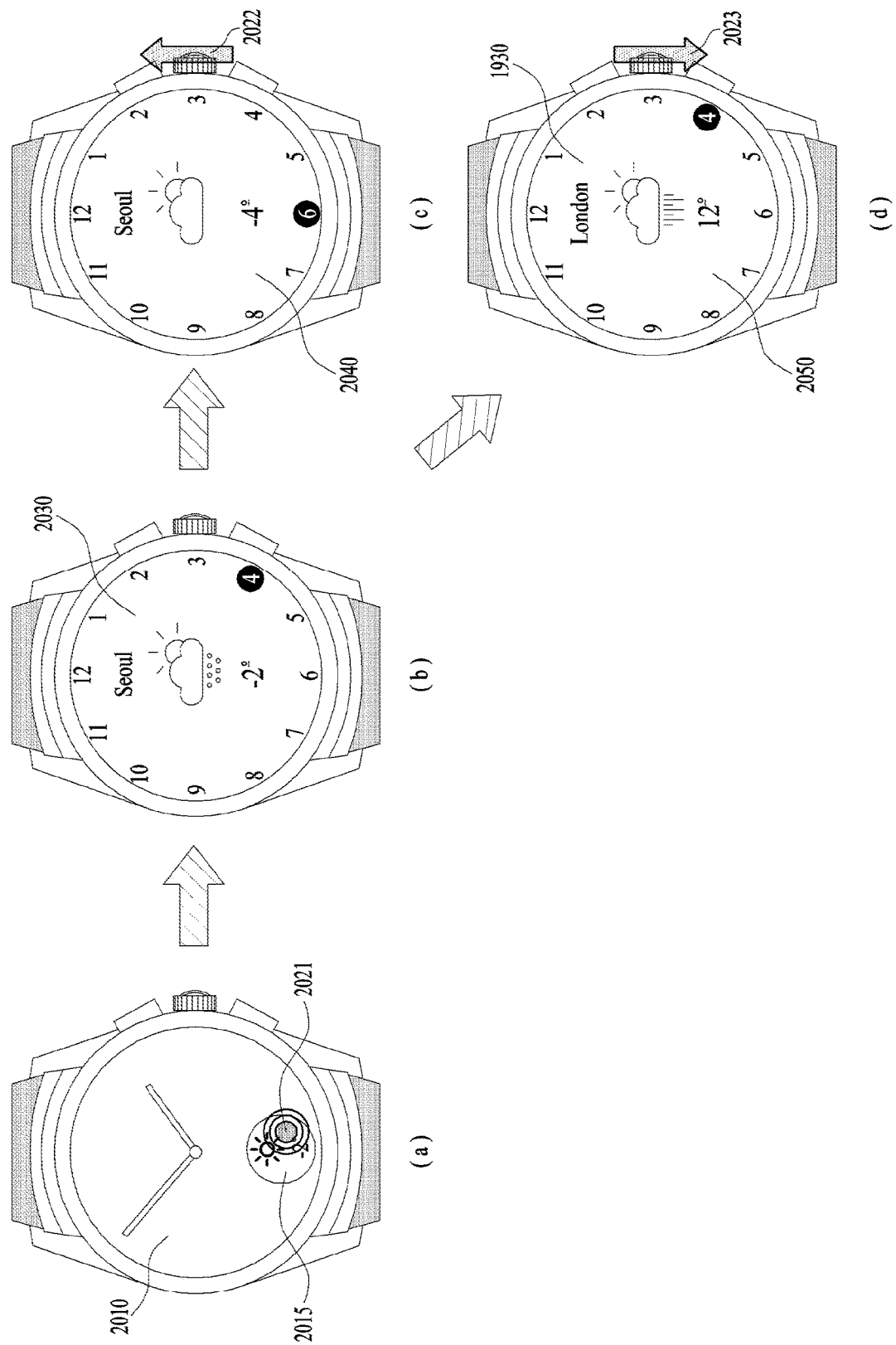
FIG. 20 is a diagram illustrating an example of watch contents including weather in a watch-type mobile terminal according to one embodiment of the present invention.

FIG. 20 is a diagram illustrating an example of watch contents including weather in a watch-type mobile terminal according to one embodiment of the present invention. More specifically, FIG. 20 shows a method of providing various contents according to an input signal in a watch screen on which not only time of a current location but also weather of the current location are provided at the same time.

First of all, referring to FIG. 20(*a*), the mobile terminal can sense a first input signal 2021 when a first screen 2010 of a watch content is output on the display unit. In embodiments of FIG. 20, time of a current location is mainly output on the first screen 2010 of the watch content and weather 2015 of the current location can be output at a partial area of the first screen. In particular, the first screen 2010 corresponds to a screen on which time is mainly output among time and weather. The first input signal 2021 may correspond to a tap input on the weather 2015 of the current location on the display unit.

As shown in FIG. 20(*b*), the mobile terminal can control a second screen 2030 to be output in response to the first input signal 2021. The second screen 2030 corresponds to a screen on which weather is mainly output among time and weather and the screen for outputting weather of a current location at the center of the display unit. Further, the second screen 2030 outputs an index indicating an hour and can provide a graphic effect indicating current time on the index instead of an hour hand and a minute hand.

The mobile terminal can sense a second input signal 2022 when the second screen 2030 is output. The second input signal 2022 may correspond to an input for rotating the crown 242 in one direction. Further, the second input signal 2022 may correspond to a signal for switching time.

As shown in FIG. 20(*c*), the mobile terminal can control weather 2040 of a current location corresponding to switched time to be output on the second screen in response to the second input signal 2022. By doing so, a user can easily check not only weather of the current time but also future weather or past weather.

A user may intend to check not only weather of a current location but also weather of a different location. The mobile terminal can sense a third input signal 2023 when a second screen 2040 is output. The third input signal 2023 may correspond to an input for rotating the crown 242 in a different direction. Further, the third input signal 2023 may correspond to a signal for switching a location.

As shown in FIG. 20(*d*), the mobile terminal can control weather 2050 of a predetermined location corresponding to current time to be output in response to the third input signal 2023. By doing so, a user can easily check not only hourly weather of a current location but also weather of a different location of the current time. Meanwhile, although an example of a rotation input on the crown in a different direction is described in the present embodiment, it is apparent that a drag touch input on the bezel unit in a different direction is also available.

Figure 21:
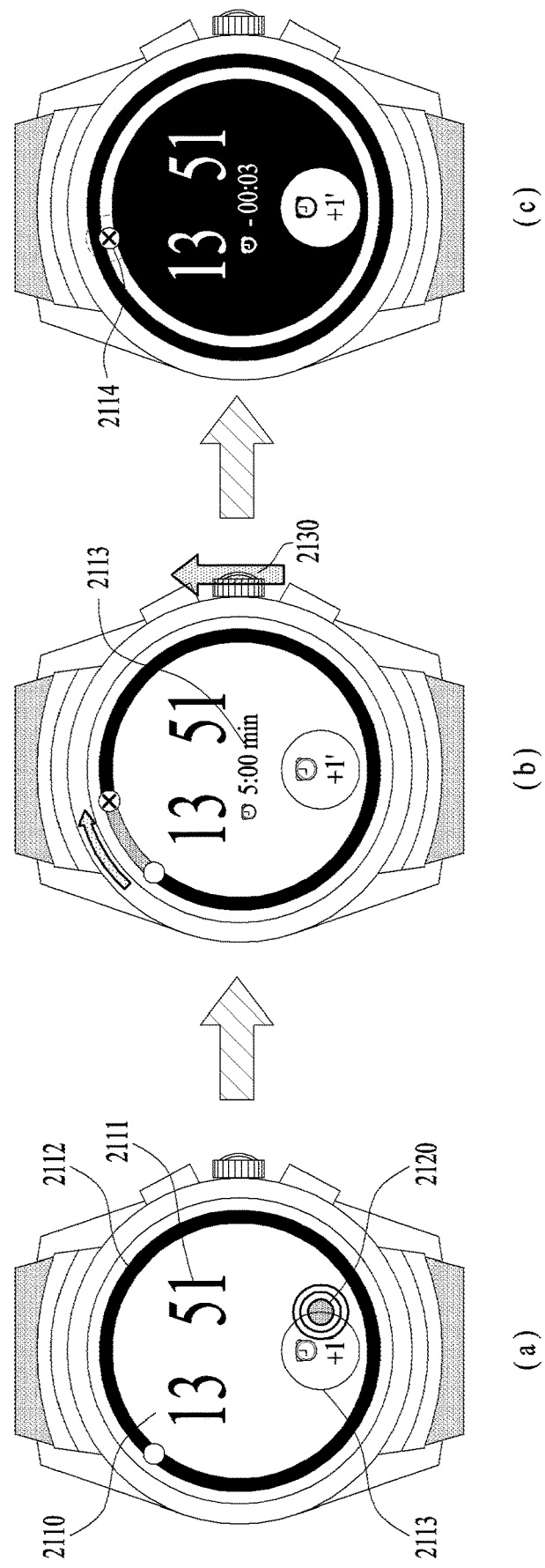
FIG. 21 is a diagram illustrating an example of a method of setting alarm in a watch-type mobile terminal according to one embodiment of the present invention.

FIG. 21 is a diagram illustrating an example of a method of setting alarm in a watch-type mobile terminal according to one embodiment of the present invention. Referring to FIG. 21(a), if an input signal (not depicted) for executing an alarm application is sensed, the mobile terminal can control a default screen 2110 of the alarm application to be output. For example, the default screen 2110 can include present time 2111, an alarm progress bar 2112, an alarm button 2113 and the like. The alarm button 2113 is a button for setting alarm time. Whenever an input signal is input, alarm is set with a predetermined time interval.

The mobile terminal can sense a first input signal 2120 for setting alarm. The first input signal 2120 may correspond to an input of tapping 5 times in a row. As shown in FIG. 21(b), alarm time can be set to time in 5 minutes. Hence, the alarm progress bar 2112 can also output a graphic effect indicating 5 minutes.

As an example, if a second input signal 2130 is sensed after the first input signal 2120, the mobile terminal can start to count alarm time. For example, the second input signal 2130 may correspond to a rotation input on the crown 242. As a different example, if there is no additional input signal for a prescribed time after the input signal 2120 is sensed, the mobile terminal automatically sets alarm and starts to count alarm time.

Subsequently, referring to FIG. 21(c), if there is not much alarm setting time left, the mobile terminal can inform a user that alarm time is imminent using a scheme of changing color or the like. The user can terminate the alarm by touching an end button 2114 on the progress bar 2112.

Figure 22:
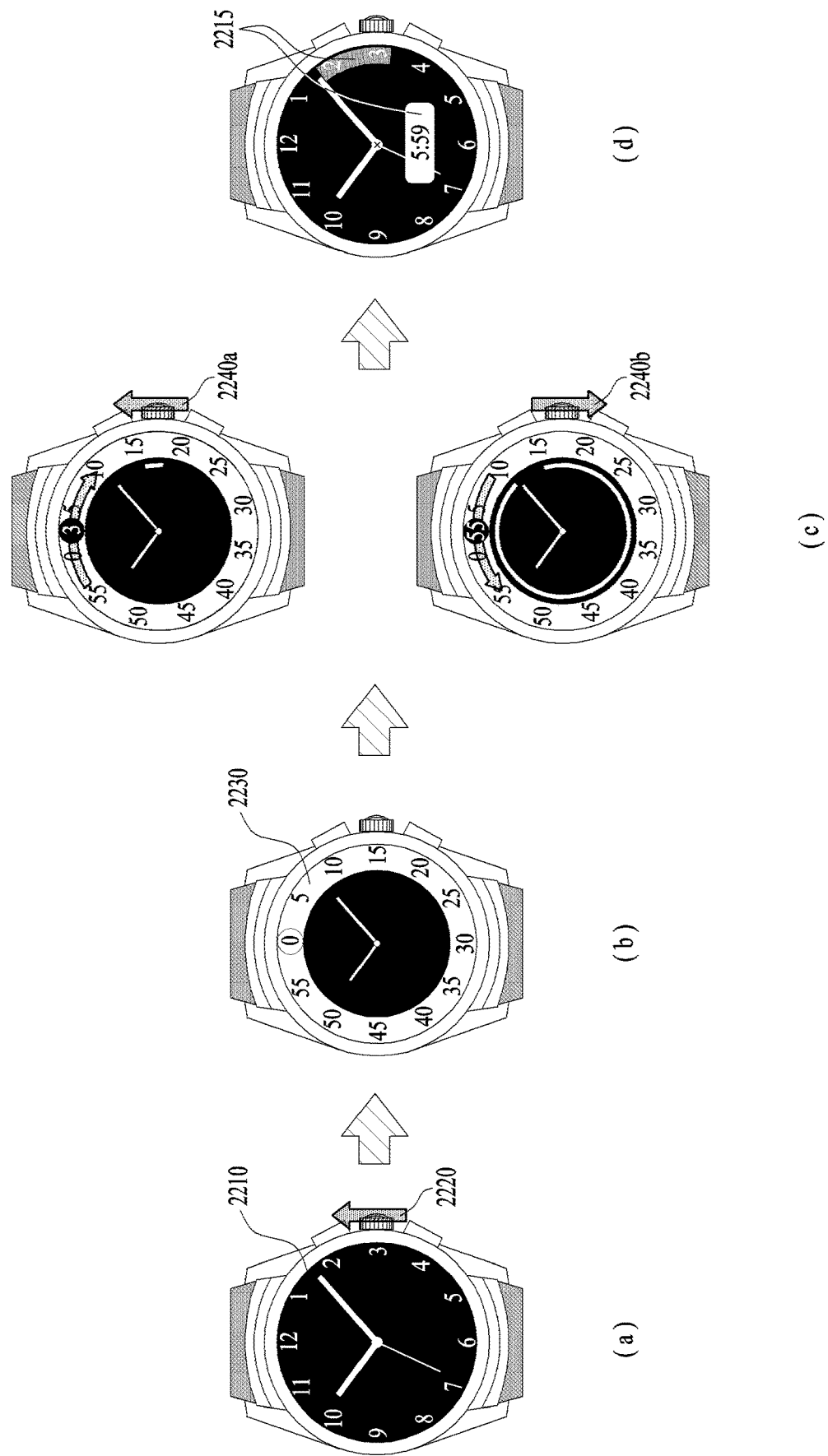
FIG. 22 is a diagram illustrating a different example of a method of setting alarm in a watch-type mobile terminal according to one embodiment of the present invention.

FIG. 22 is a diagram illustrating a different example of a method of setting alarm in a watch-type mobile terminal according to one embodiment of the present invention. Referring to FIG. 22(a), if a first input signal 2220 is sensed on a default watch screen 2210, it may enter an alarm setting mode. In case of entering the alarm setting mode, as shown in FIG. 22(b), the mobile terminal reduces a size of the watch screen and can output an index 2230 for setting alarm near the bezel unit.

Subsequently, the mobile terminal can sense a second input signal 2240 in the alarm setting mode. Referring to FIG. 22(c), the mobile terminal can sense an input signal 2240a for rotating the crown 242 in up direction or an input signal 2240b for rotating the crown in down direction. Further, the mobile terminal sets alarm time according to the rotation of the crown. If the rotation of the crown stops and a predetermined time elapses, as shown in FIG. 22(d), the mobile terminal can control an alarm counting indicator 2215 to be output.

Figure 23:
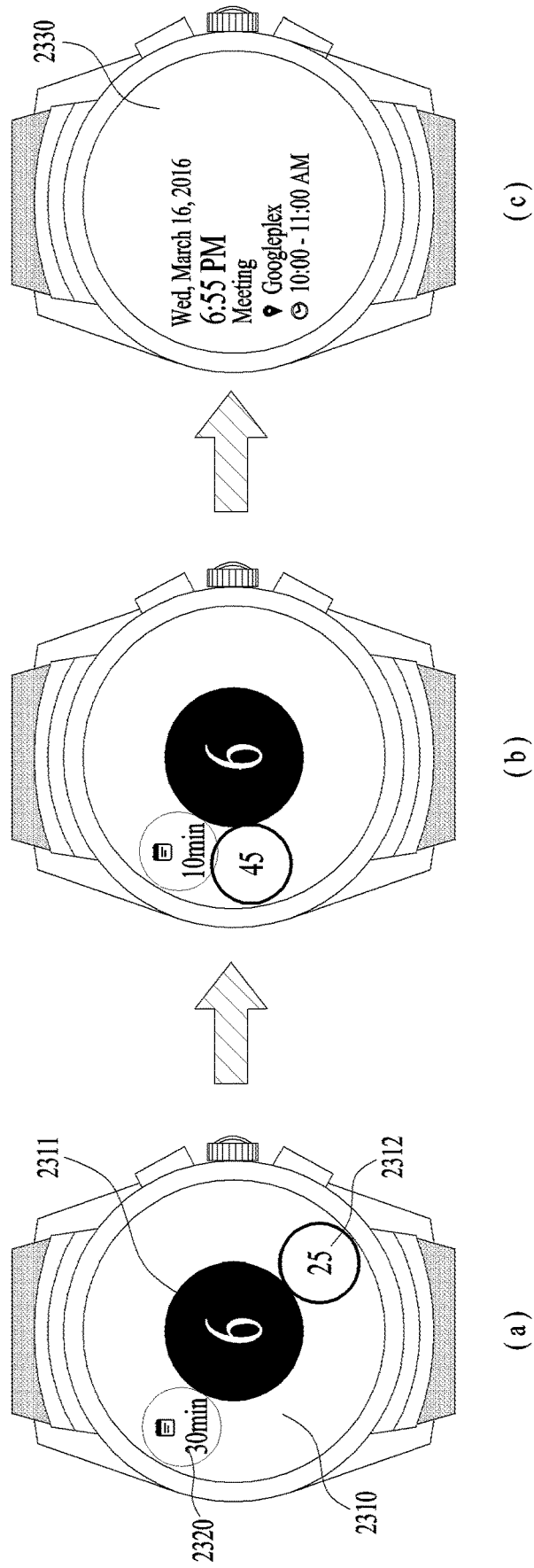
FIG. 23 is a diagram illustrating an example of a method of outputting schedule in a watch-type mobile terminal according to one embodiment of the present invention.

FIG. 23 is a diagram illustrating an example of a method of outputting schedule in a watch-type mobile terminal according to one embodiment of the present invention. More specifically, FIG. 23 shows a method of outputting present time and schedule at the same time.

Referring to FIG. 23(a), the mobile terminal can output a watch screen 2310 and a schedule icon 2320 at the same time. In an embodiment of FIG. 23(a), the watch screen 2310 can include a first icon 2311 and a second icon 2312. The first icon 2311 corresponds to an icon 2311 indicating hour and can be output at the center of the display unit. The second icon 2312 corresponds to an icon 2312 indicating minute and can rotate around the first icon 2311.

Further, the schedule icon 2320 can be output at a position corresponding to time to which schedule is set. Hence, as shown in FIG. 23(b), as time goes by, although a position of the second icon 2312 changes, the schedule icon 2320 can be output at a fixed position.

If the second icon 2311 is overlapped with the schedule icon 2320, the mobile terminal can output schedule information 2330. More specifically, if present time corresponds to estimated time of a schedule, as shown in FIG. 23(c), the mobile terminal can output detail information on the schedule on the display unit.

Figure 24:
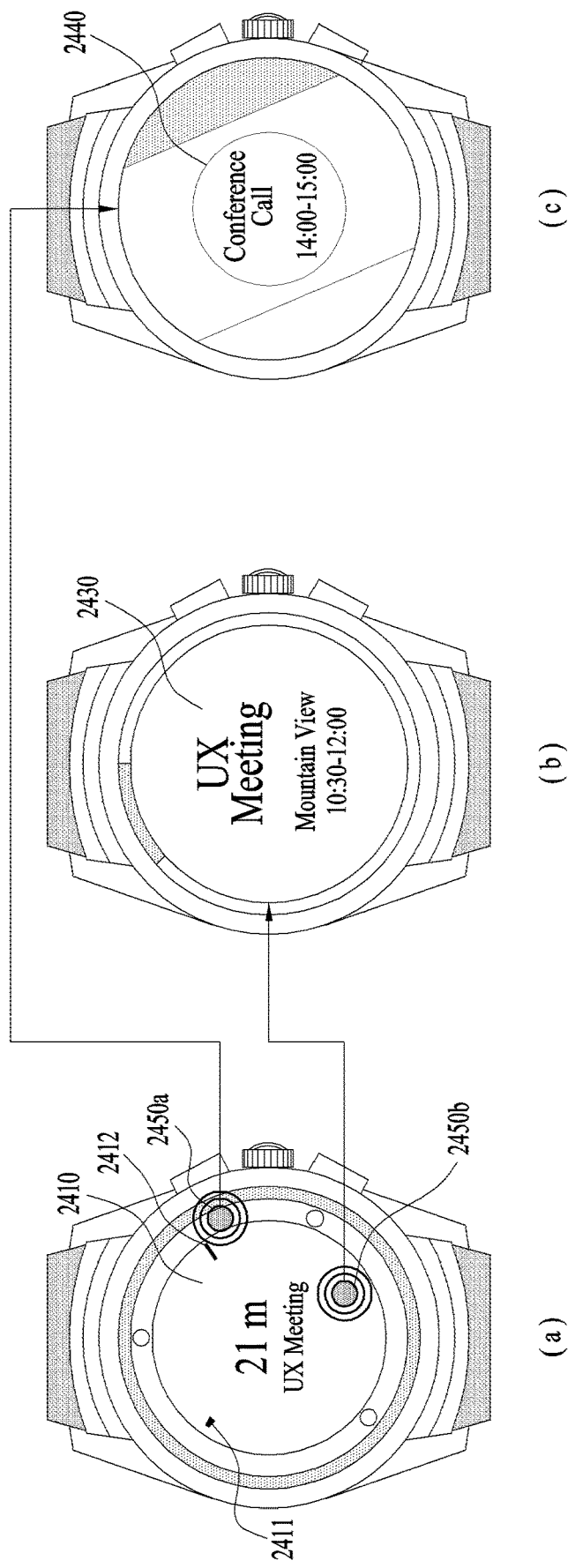
FIG. 24 is a diagram illustrating a different example of a method of outputting schedule in a watch-type mobile terminal according to one embodiment of the present invention.

FIG. 24 is a diagram illustrating a different example of a method of outputting schedule in a watch-type mobile terminal according to one embodiment of the present invention. Referring to FIG. 24(a), if a schedule application is executed, the mobile terminal can output a name of an upcoming schedule and remaining time 2410 at the center of the display unit. Further, the mobile terminal can output an hour hand 2411 and a minute hand 2412 with a small size. Meanwhile, the mobile terminal can output an icon 2425 indicating a planned schedule in the vicinity of the bezel unit.

As an example, an input signal 2450a input on the icon 2425 indicating a schedule can be sensed. As shown in FIG. 24(c), the mobile terminal can output magnified information 2440 of the icon 2425. Further, as a different example, an input signal 2450b input on an upcoming event 2410 can be sensed. In this instance, as shown in FIG. 24(b), the mobile terminal can output detail information 2430 on the upcoming schedule.

Figure 25:
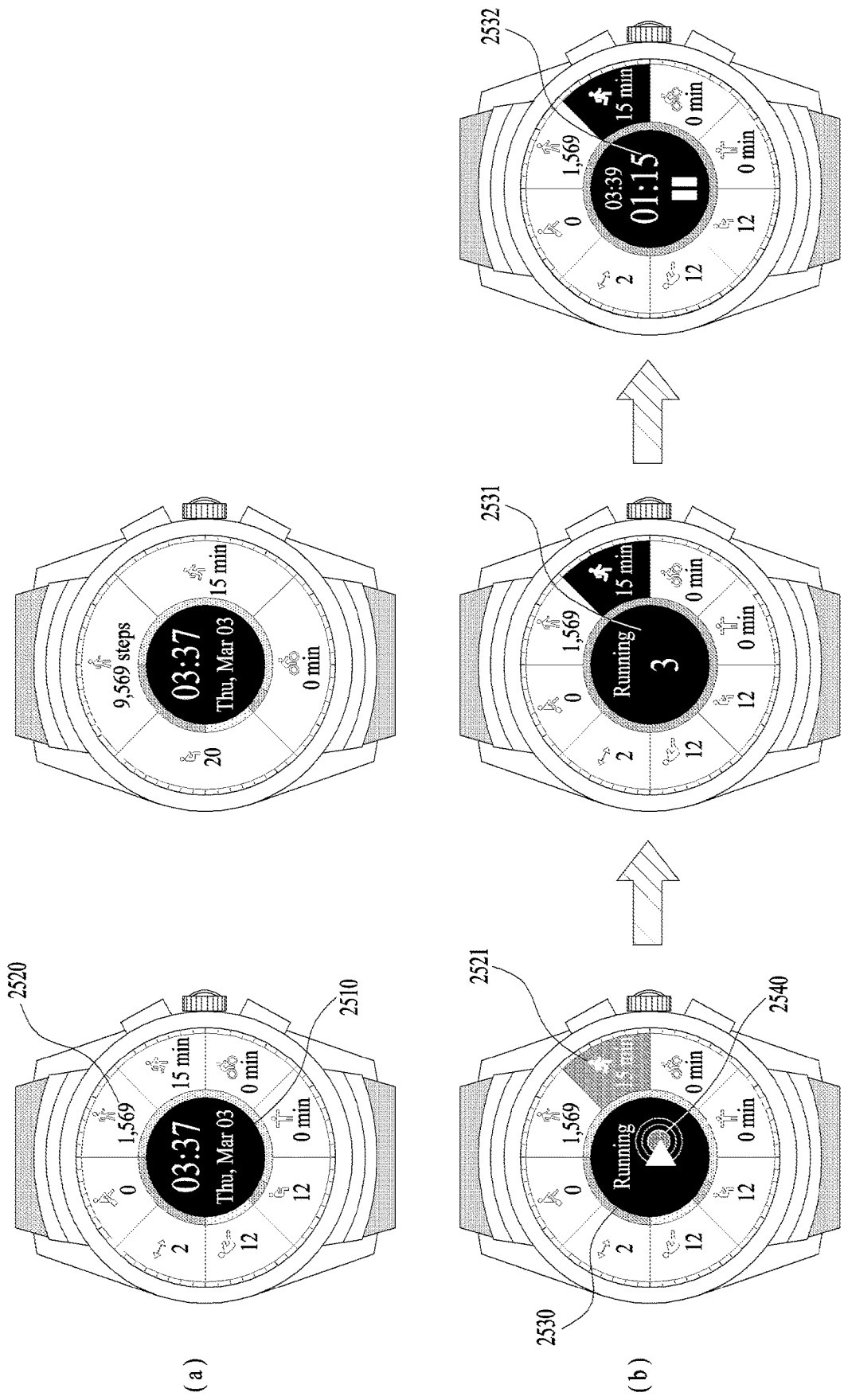
FIG. 25 is a diagram illustrating an execution screen of an exercise application in a watch-type mobile terminal according to one embodiment of the present invention.

FIG. 25 is a diagram illustrating an execution screen of an exercise application in a watch-type mobile terminal according to one embodiment of the present invention. First of all, referring to FIG. 25(a), an execution screen of an exercise application can be output in various ways depending on a setting. A left drawing of FIG. 25(a) corresponds to a detail view. The detail view outputs time information at the center and outputs exercise items of 8 types. A right drawing of FIG. 25(a) corresponds to a simple view. The simple view outputs time information at the center and outputs exercise items of 4 types.

FIG. 25(b) corresponds to a case of selecting running exercise 2521 from the detail view. If the running exercise 2521 is selected, the mobile terminal an output an exercise start button 2530. If an input signal 2540 input on the exercise start button 2530 is sensed, as shown in a second drawing of FIG. 25(b), the mobile terminal can output a countdown 2531. Further, if exercise is started, the mobile terminal can control exercise elapsed time 2532 to be output.

Figure 26:
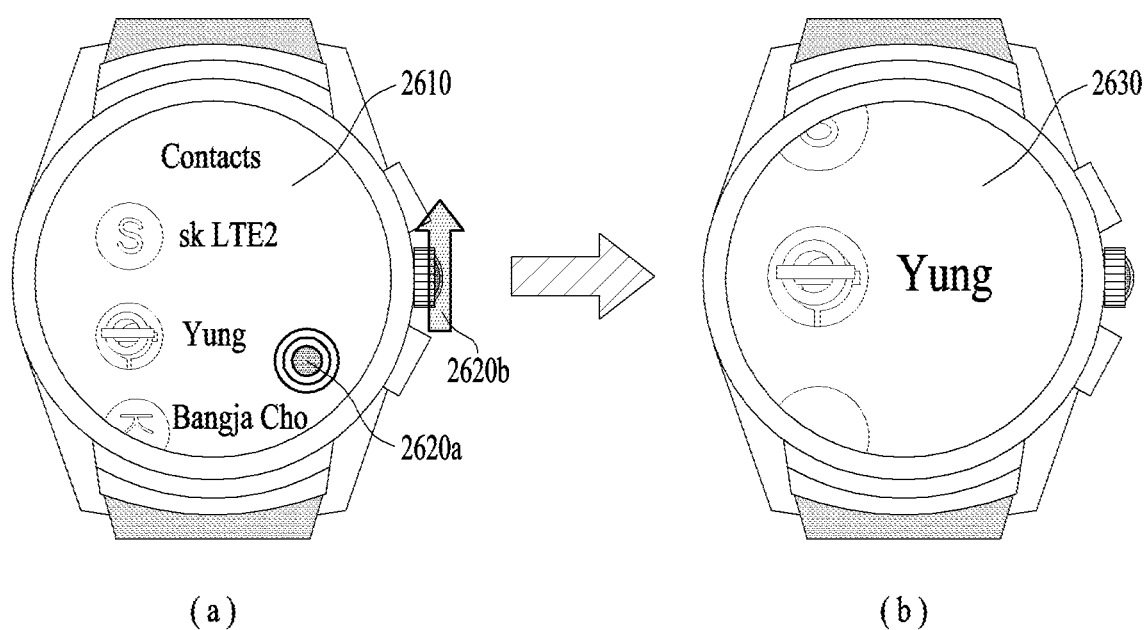
FIG. 26 is a diagram illustrating an example of a method of outputting contents by magnifying the contents in a watch-type mobile terminal according to one embodiment of the present invention.

FIG. 26 is a diagram illustrating an example of a method of outputting contents by magnifying the contents in a watch-type mobile terminal according to one embodiment of the present invention. More specifically, FIG. 26 shows a method of magnifying contents output on the display unit using a touch input or a rotation input.

Referring to FIG. 26(a), the mobile terminal can sense a first input signal 2620a and a second input signal 2620b when contents 2610 including a list are output on the display unit. The first input signal 2620a corresponds to a touch input on the display unit and the second input signal 2620b may correspond to a rotation input on the crown 242. Further, the first input signal 2620a and the second input signal 2620b can be sequentially sensed or sensed at the same time.

As shown in FIG. 26(b), the mobile terminal can output magnified content 2630 in response to the first input signal 2620a and the second input signal 2620b. The magnified content may correspond to content magnified based on an area at which the first input signal 2620a is sensed in the contents 2610.

Figure 27:
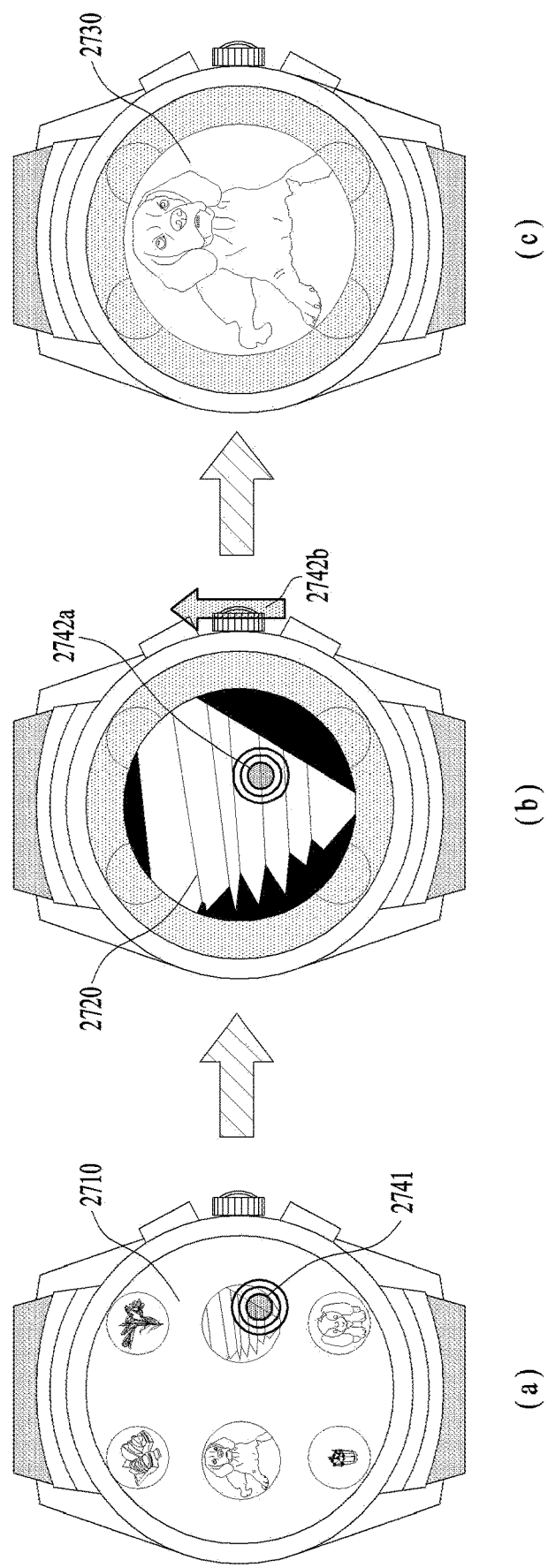
FIG. 27 is a diagram illustrating a different example of a method of outputting contents by magnifying the contents in a watch-type mobile terminal according to one embodiment of the present invention.

FIG. 27 is a diagram illustrating a different example of a method of outputting contents by magnifying the contents in a watch-type mobile terminal according to one embodiment of the present invention. More specifically, FIG. 27 shows a method of providing a preview of a part of contents output on the display unit.

Referring to FIG. 27(*a*), the mobile terminal can sense a first input signal 2741 input on a first thumbnail when a list 2710 of a plurality of image thumbnails is output. For example, the first input signal 2741 may correspond to various touch inputs including a long touch, a short touch, a long and press touch, and the like. Further, the first input signal 2741 may correspond to an input for magnifying a thumbnail image.

The mobile terminal can output an image 2720 corresponding to the first thumbnail in response to the first input signal 2741. As shown in FIG. 27(*b*), the mobile terminal can output the image 2720 by overlaying the image on the thumbnail list 2710.

Meanwhile, a user may intend to check a different thumbnail image rather than the first thumbnail by magnifying the different thumbnail image. The mobile terminal can sense a second input signal 2742*a* and a third input signal 2742*b*. The second input signal 2742*a* corresponds to various touch inputs input on the display unit and the third input signal 2742*b* may correspond to a rotation input on the crown 242. Further, the second input signal 2742*a* and the third input signal 2742*b* can be sequentially sensed or can be sensed at the same time.

In this instance, as shown in FIG. 27(*c*), the mobile terminal can control an image 2730 corresponding to a second thumbnail adjacent to the first thumbnail to be output on the thumbnail list 2710 in response to the second input signal 2742*b* and the third input signal 2742*c*.

Figure 28:
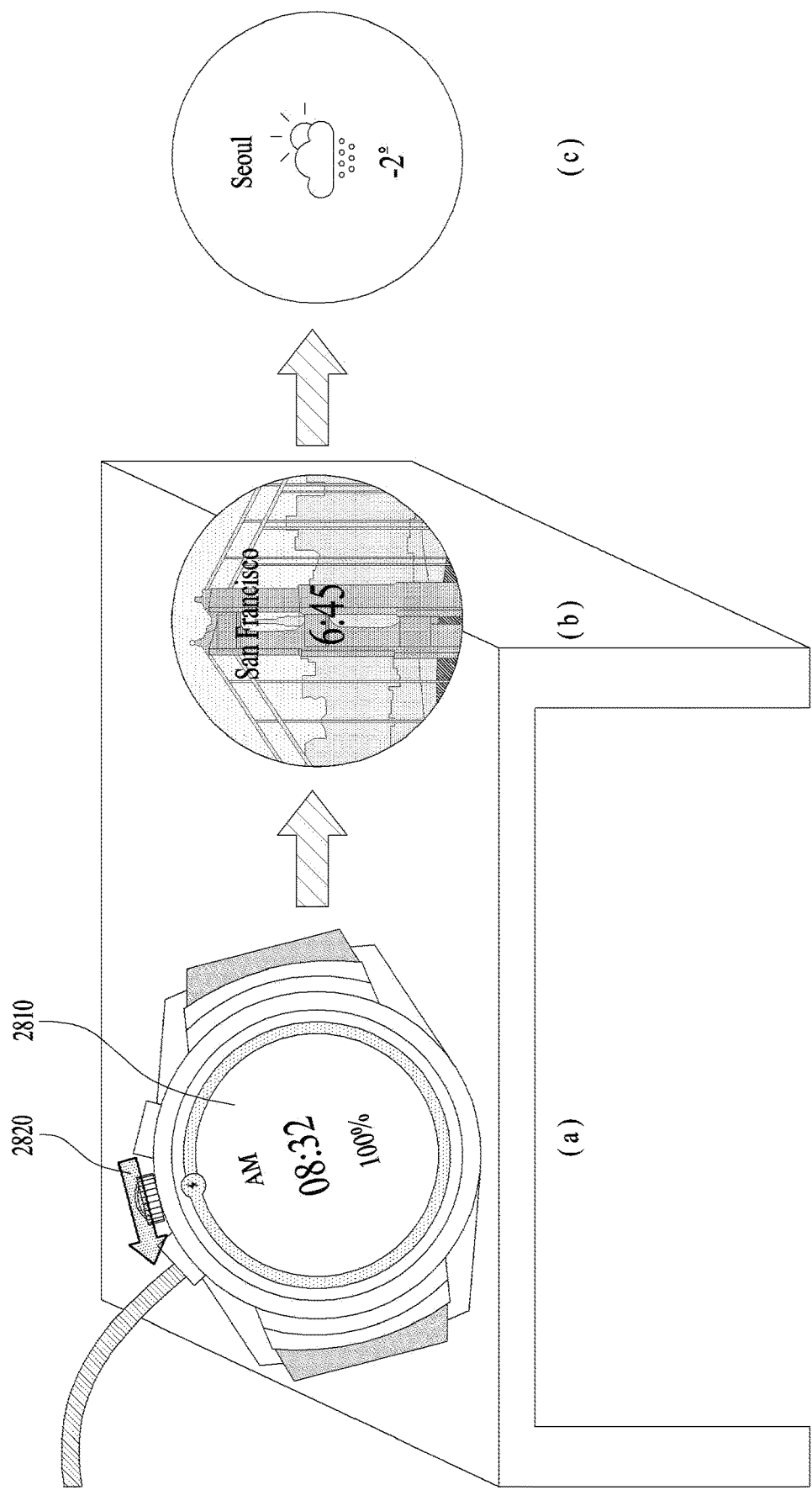
FIG. 28 is a diagram illustrating an example of contents output on a display unit in a charging mode of a watch-type mobile terminal according to one embodiment of the present invention.

FIG. 28 is a diagram illustrating an example of contents output on a display unit in a charging mode of a watch-type mobile terminal according to one embodiment of the present invention. First of all, as shown in FIG. 28(*a*), if the mobile terminal is connected with a charging cradle, the mobile terminal enters a charging mode. The mobile terminal can output default content 2810 on the display unit. For example, the default content 2810 may correspond to a screen indicating a watch and a charging status.

Meanwhile, if there is no movement for a prescribed time when the mobile terminal is not worn on a user, the mobile terminal can output the default content 2810 on the display unit. Further, a user may intend to check simple information when the mobile terminal is charging. The information to be checked by the user may correspond to information frequently used by the user or information automatically set to the mobile terminal. Regarding this, as shown in FIG. 28(*a*), the mobile terminal can sense a rotation input on the crown 242.

As shown in FIG. 28(*b*), the mobile terminal can control a world weather widget corresponding to predetermined information to be output. Further, if an additional rotation input on the crown is sensed, as shown in FIG. 28(*c*), the mobile terminal can control a weather widget to be output. By doing so, a user can easily check necessary information when the mobile terminal is charging or a state that the mobile terminal is not worn on the user.

FIG. 29 is a diagram illustrating an example of a method of differently outputting contents according to angle information sensed on a watch-type mobile terminal according to one embodiment of the present invention. The mobile terminal according to an embodiment of the present invention can include various sensors capable of sensing an angle such as a gyro sensor, an acceleration sensor and the like. In particular, although an identical input signal is sensed, if a different angle of the mobile terminal is sensed, the mobile terminal can output different content.

As an example, referring to FIG. 29(*a*), the mobile terminal may be positioned within a range of a viewing angle of a user. Regarding this, whether or not the mobile terminal is positioned within the range of the viewing angle of the user can be determined based on a sensor configured to sense an angle of the mobile terminal, a camera mounted on the mobile terminal, and the like. When the mobile terminal is positioned within the range of the viewing angle of the user, if an input signal input on the mobile terminal is sensed, it can perform a direct control on contents executed in the foreground. For example, if a rotation input on the crown is sensed, the mobile terminal can perform scrolling on currently output contents. And. For example, if a drag touch input on the bezel unit is sensed, the mobile terminal can switch the currently output contents into different content.

As a different example, referring to FIG. 29(*b*), the mobile terminal may be position at the outside of a range of a viewing angle of a user. When the mobile terminal is position at the outside of the range of the viewing angle of the user, if an input signal input on the mobile terminal is sensed, it can perform control on contents executed in the background. For example, if a rotation input on the crown is sensed, the mobile terminal can adjust volume of music currently played in the mobile terminal.

According to at least one embodiment among embodiments of the present invention, it can easily control contents output on the display unit by operating the bezel unit or the crown. Further, according to at least one embodiment among embodiments of the present invention, it can control contents output on the display unit in detail by differentiating a speed and a direction of a rotation input on the bezel unit or the crown.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a watch-type mobile terminal, the method comprising:
   performing communication with an external device via a wireless communication unit;
   executing a contact application stored in a memory;
   displaying a contact list on a display unit when the contact application is executed;
   sensing a drag touch input on the display unit;
   scrolling the contact list contact-by-contact to search for a specific contact in response to the sensed drag touch input;
   displaying a first set of contacts on the display unit among contacts included in the contact list in response to the scrolled contact list;
   sensing a rotation input on a bezel of the watch-type mobile terminal after the first set of contacts is displayed on the display unit;
   in response to a speed of the sensed rotation input on the bezel being faster than a predetermined speed, displaying a quick scroll pop-up screen on the display unit overlaid onto a second set of contacts displayed on the display unit; and
   in response to a speed of the sensed rotation input on the bezel being slower than the predetermined speed, displaying a different screen on the display unit that is different than a screen where the quick scroll pop-screen and the contact list are displayed.

2. The method of claim 1, wherein the bezel comprises a ring shaped member.

3. The method of claim 2, wherein the bezel is configured to hold a separate glass or crystal member for protecting the display unit.

4. The method of claim 1, wherein the different screen comprises a favorite list displaying favorite contacts among the contacts in the contact list.

5. A watch-type mobile terminal for communicating with an external device, the watch-type mobile terminal comprising:
   a wireless communication unit configured to perform communication with the external device;
   a display unit configured to display a contact list when the contact application is executed, and
   a controller configured to:
     sense a drag touch input on the display unit;
     scroll the contact list contact-by-contact to search for a specific contact in response to the sensed drag touch input;
     display a first set of contacts on the display unit among contacts included in the contact list in response to the scrolled contact list;
     sense a rotation input on a bezel of the watch-type mobile terminal after the first set of contacts is displayed on the display unit;
     in response to a speed of the sensed rotation input on the bezel being faster than a predetermined speed, displaying a quick scroll pop-up screen on the display unit overlaid onto a second set of contacts displayed on the display unit; and
     in response to a speed of the sensed rotation input on the bezel being slower than the predetermined speed, displaying a different screen on the display unit that is different than a screen where the quick scroll pop-screen and the contact list are displayed.

6. The watch-type mobile terminal of claim 5, wherein the bezel comprises a ring shaped member.

7. The watch-type mobile terminal of claim 6, wherein the bezel is configured to hold a separate glass or crystal member for protecting the display unit.

* * * * *